US006956666B2

(12) United States Patent
Tanaka

(10) Patent No.: US 6,956,666 B2
(45) Date of Patent: *Oct. 18, 2005

(54) PRINT SERVICE, ORDER ACCEPTANCE METHOD, AND COOPERATION SYSTEM AND METHOD

(75) Inventor: Masahide Tanaka, Kawasaki (JP)

(73) Assignees: Nikon Corporation, Tokyo (JP); Nikon Technologies Inc., Tokyo (JP)

(*) Notice: Subject to any disclaimer, the term of this patent is extended or adjusted under 35 U.S.C. 154(b) by 928 days.

This patent is subject to a terminal disclaimer.

(21) Appl. No.: 09/799,721

(22) Filed: Mar. 7, 2001

(65) Prior Publication Data

US 2001/0024294 A1 Sep. 27, 2001

(30) Foreign Application Priority Data

Mar. 17, 2000 (JP) ....................................... 2000-075767
Jan. 30, 2001 (JP) ....................................... 2001-022259
Mar. 14, 2002 (JP) ....................................... 2000-069950

(51) Int. Cl.[7] ................................................ G06K 15/00
(52) U.S. Cl. ....................................... 358/1.15; 358/1.6
(58) Field of Search ................................ 358/1.1, 1.15, 358/1.18, 1.4, 1.6, 402, 405, 407; 709/247; 346/107.3, 146

(56) References Cited

U.S. PATENT DOCUMENTS 5,805,807 A * 9/1998 Hanson et al. .............. 370/340
6,776,337 B2 * 8/2004 Irwin et al. ................. 235/441

FOREIGN PATENT DOCUMENTS

| | | |
|---|---|---|
| JP | A 6-96329 | 4/1994 |
| JP | A 10-13589 | 1/1998 |
| JP | A 10-254957 | 9/1998 |
| JP | A 11-004311 | 1/1999 |
| JP | A 11-154218 | 6/1999 |
| JP | A 11-205503 | 7/1999 |
| JP | A 11-349104 | 12/1999 |

* cited by examiner

*Primary Examiner*—Arthur G Evans
(74) *Attorney, Agent, or Firm*—Oliff & Berridge PLC

(57) ABSTRACT

A plurality of sites for print service each having its own available public transportation system for delivering the print are in cooperation. An order from a customer accepted at a site is mutually assigned to another site in dependence on which is the most convenient public transportation system to deliver the print to the destination designated by the customer. The sites and the destination are typically at stations of railroads, respectively. The assignment of the order is made by way of a managing center capable of settling the assignment, recording a report from the assignee site, balancing the accounts among the sites by gathering accounts caused by the assignment of order, or dividing an order into a plurality of sub-orders for a plurality of destinations corresponding thereto. Order may be accepted through a computer communication, in which a computer of the acceptance site provides with a combined data composed of a plurality of kinds of data from the customer. The customer for a convenience upon the next order keeps such a combined data.

80 Claims, 32 Drawing Sheets

| Image No. | 1 | 2 | 3 | 4 | 5 |
|---|---|---|---|---|---|
| Size | Regular | Regular | A5 | | |
| Prints | 1 | 3 | 1 | | |

TRANSMISSION DETERMINING PROCEDURE

DELIVERY MANAGEMENT FLOW

CUSTOMER CONTROL FLOW

ORDER ACCEPTANCE FLOW

ORDER WINDOW

| | |
|---|---|
| ACCEPTANCE DATE | 2000/3/11 |
| ACCEPTER | LAB A |
| ACCEPTANCE ID | 1 |
| CUSTOMER | Ichiro Yamada |
| ADDRESS | 123, Ohi, Shinagwa-ku, Tokyo, Japan |
| TEL. | 03-1234-1234 |
| NUMBER OF DESTINATION(S) | 3 |

| DESTINATION(S) | | TRANSMISSION |
|---|---|---|
| ① | Tokyo Convenience Store, Shinagawa Shop | NO NEED |
| ② | Tokyo Convenience Store, Kawasaki Shop | LAB B |
| ③ | Central Station, Osaka Railroad | LAB C |
| ④ | | |

| IMAGE No. | | 1 | 2 | 2 | 3 | 計 |
|---|---|---|---|---|---|---|
| PRINT SIZE | | REGULAR (@¥50) | REGULAR (@¥50) | A5 (@¥100) | REGULAR (@¥50) | |
| NUMBER OF PRINT(S) | DESTINATION① | 5 | 3 | 1 | 0 | |
| | DESTINATION② | | | 7 | 6 | |
| | DESTINATION③ | 10 | 10 | | 10 | |
| | DESTINATION④ | | | | | |
| FEE | DESTINATION① | ¥250 | ¥150 | ¥100 | ¥0 | ¥500 |
| | DESTINATION② | | | ¥700 | ¥300 | ¥1,000 |
| | DESTINATION③ | ¥500 | ¥500 | | ¥500 | ¥1,500 |
| | DESTINATION④ | | | | | |
| | | | | | TOTAL | ¥3,000 |

ACCOUNT TO CUSTOMER

| | |
|---|---|
| BASIC FEE | ¥200 |
| PRINT/DELIVERY FE | ¥3,000 |
| TRANSMISSION FEE | ¥200 |
| TOTAL | ¥3,400 |

FIG.21

ALL ORDERS GATHERING INTO MANAGING CENTER

| SERIAL ID | ACCEPTANCE DATE | ACCEPTER | ACCEPTANCE ID | ASSIGNEE | FEE | ASSIGNMENT DATE | DELIVERY DATE | DELIVERY TIME | CURRENT STATUS |
|---|---|---|---|---|---|---|---|---|---|
| 1 | 2000/3/11 | LAB A | 1 | LAB A | ¥500 | — | | | |
| 2 | 2000/3/11 | LAB A | 1 | LAB B | ¥1,000 | 2000/3/11 | 2000/3/12 | 13:30 | DELIVERED |
| 3 | 2000/3/11 | LAB A | 1 | LAB C | ¥1,500 | 2000/3/11 | 2000/3/12 | 15:00 | DELIVERED |
| 4 | 2000/3/11 | LAB B | 1 | LAB B | ¥700 | — | | | |
| 5 | 2000/3/11 | LAB A | 2 | LAB A | ¥1,300 | — | | | |
| 6 | 2000/3/12 | LAB A | 2 | LAB B | ¥1,200 | 2000/3/12 | | | CARRIED |
| 7 | 2000/3/12 | LAB B | 2 | LAB A | ¥3,000 | 2000/3/12 | 2000/3/13 | 11:00 | DELIVERED |
| 8 | 2000/3/12 | LAB A | 3 | LAB A | ¥900 | — | | | |
| 9 | 2000/3/12 | LAB C | 1 | LAB C | ¥1,100 | — | | | |
| 10 | 2000/3/13 | LAB D | 1 | LAB D | ¥2,100 | — | | | |
| 11 | 2000/3/13 | LAB A | 4 | LAB A | ¥1,800 | — | | | |
| 12 | 2000/3/13 | LAB B | 3 | LAB D | ¥800 | 2000/3/13 | 2000/3/13 | 17:15 | DELIVERED |
| 13 | 2000/3/14 | LAB D | 2 | LAB A | ¥1,600 | 2000/3/14 | | | CARRIED |
| 14 | 2000/3/14 | LAB A | 5 | LAB A | ¥3,500 | — | | | |
| 15 | 2000/3/14 | LAB A | 6 | LAB D | ¥950 | 2000/3/15 | | | ASSIGNED |
| 16 | 2000/3/15 | LAB C | 2 | LAB B | ¥2,000 | 2000/3/15 | | | PRINTED |
| 17 | 2000/3/15 | LAB C | 3 | LAB D | ¥2,500 | 2000/3/15 | | | ASSIGNED |
| 18 | 2000/3/16 | LAB A | 7 | LAB B | ¥1,400 | | | | UNSETTLED |
| | | | | TOTAL | ¥27,850 | | | | |

FIG.23

STRUCTURE OF ACCOUNT CHARGED ON CUSTOMER

| SERIAL ID | INTERESTED LAB | ORDER ID | BASIC FEE | PRINT/DELIVERY FEE | NUMBER OF TRANSMISSION(S)(@¥100) | TRANSMISSION FEE IN TOTAL | SUB TOTAL | TOTAL |
|---|---|---|---|---|---|---|---|---|
| 1 | LAB A | A−1 | ¥200 | ¥500 | 2 | ¥200 | ¥900 | ¥3,400 |
| 2 | LAB B | A−1 | | ¥1,000 | | | ¥1,000 | |
| 3 | LAB C | A−1 | | ¥1,500 | | | ¥1,500 | |
| 4 | LAB B | B−1 | ¥200 | ¥700 | 0 | ¥0 | ¥900 | ¥900 |
| 7 | LAB B | B−2 | ¥200 | | 1 | ¥100 | ¥300 | ¥3,300 |
| 7 | LAB A | B−2 | | ¥3,000 | | | ¥3,000 | |

FIG.24

ORDERS WITH ACCOUNTS BALANCED BY MANAGING CENTER

| SERIAL ID | ACCEPTANCE DATE | ACCEPTER | ACCEPTANCE ID | ASSIGNEE | FEE | ASSIGNMENT DATE | DELIVERY DATE | DELIVERY TIME | CURRENT STATUS |
|---|---|---|---|---|---|---|---|---|---|
| 2 | 2000/3/11 | LAB A | 1 | LAB B | ¥1,000 | 2000/3/11 | 2000/3/12 | 13:30 | DELIVERED |
| 3 | 2000/3/11 | LAB A | 1 | LAB C | ¥1,500 | 2000/3/11 | 2000/3/12 | 15:00 | DELIVERED |
| 6 | 2000/3/12 | LAB A | 2 | LAB B | ¥1,200 | 2000/3/12 | 2000/3/12 | | CARRIED |
| 7 | 2000/3/12 | LAB B | 2 | LAB A | ¥3,000 | 2000/3/12 | 2000/3/13 | 11:00 | DELIVERED |
| 12 | 2000/3/13 | LAB B | 3 | LAB D | ¥800 | 2000/3/13 | 2000/3/13 | 17:15 | DELIVERED |
| 13 | 2000/3/14 | LAB D | 2 | LAB A | ¥1,600 | 2000/3/14 | | | CARRIED |
| 15 | 2000/3/14 | LAB A | 6 | LAB D | ¥950 | 2000/3/15 | | | ASSIGNED |
| 16 | 2000/3/15 | LAB C | 2 | LAB B | ¥2,000 | 2000/3/15 | | | PRINTED |
| 17 | 2000/3/15 | LAB C | 3 | LAB D | ¥2,500 | 2000/3/15 | | | ASSIGNED |
| 18 | 2000/3/16 | LAB A | 7 | LAB B | ¥1,400 | | | | UNSETTLED |
| | | | | TOTAL | ¥15,950 | | | | |

FIG.25

ALL ORDERS RELATING TO LAB A

| SERIAL ID | ACCEPTANCE DATE | ACCEPTER | ACCEPTANCE ID | ASSIGNEE | FEE | ASSIGNMENT DATE | DELIVERY DATE | DELIVERY TIME | CURRENT STATUS |
|---|---|---|---|---|---|---|---|---|---|
| 1 | 2000/3/11 | LAB A | 1 | LAB A | ¥500 | — | | | |
| 2 | 2000/3/11 | LAB A | 1 | LAB B | ¥1,000 | 2000/3/11 | 2000/3/12 | 13:30 | DELIVERED |
| 3 | 2000/3/11 | LAB A | 1 | LAB C | ¥1,500 | 2000/3/11 | 2000/3/12 | 15:00 | DELIVERED |
| 5 | 2000/3/11 | LAB A | 2 | LAB A | ¥1,300 | — | | | |
| 6 | 2000/3/12 | LAB A | 2 | LAB B | ¥1,200 | 2000/3/12 | | | CARRIED |
| 7 | 2000/3/12 | LAB B | 2 | LAB A | ¥3,000 | 2000/3/12 | 2000/3/13 | 11:00 | DELIVERED |
| 8 | 2000/3/12 | LAB A | 3 | LAB A | ¥900 | — | | | |
| 11 | 2000/3/13 | LAB A | 4 | LAB A | ¥1,800 | — | | | |
| 13 | 2000/3/14 | LAB D | 2 | LAB A | ¥1,600 | 2000/3/14 | | | CARRIED |
| 14 | 2000/3/14 | LAB A | 5 | LAB A | ¥3,500 | — | | | |
| 15 | 2000/3/14 | LAB A | 6 | LAB D | ¥950 | 2000/3/15 | | | ASSIGNED |
| 18 | 2000/3/16 | LAB A | 7 | LAB B | ¥1,400 | | | | UNSETTLED |
| | | | | TOTAL | ¥18,650 | | | | |

FIG.26

ORDERS CARRIED OUT BY LAB A

| SERIAL ID | ACCEPTANCE DATE | ACCEPTER | ACCEPTANCE ID | ASSIGNEE | FEE | ASSIGNMENT DATE | DELIVERY DATE | DELIVERY TIME | CURRENT STATUS |
|---|---|---|---|---|---|---|---|---|---|
| 1 | 2000/3/11 | LAB A | 1 | LAB A | ¥500 | — | | | |
| 5 | 2000/3/11 | LAB A | 2 | LAB A | ¥1,300 | — | | | |
| 7 | 2000/3/12 | LAB B | 2 | LAB A | ¥3,000 | 2000/3/12 | 2000/3/13 | 11:00 | DELIVERED |
| 8 | 2000/3/12 | LAB A | 3 | LAB A | ¥900 | — | | | |
| 11 | 2000/3/13 | LAB A | 4 | LAB A | ¥1,800 | — | | | |
| 13 | 2000/3/14 | LAB D | 2 | LAB A | ¥1,600 | 2000/3/14 | | | CARRIED |
| 14 | 2000/3/14 | LAB A | 5 | LAB A | ¥3,500 | — | | | |
| | | | | TOTAL | ¥12,600 | | | | |

FIG.27

PROSECUTION REPORT WINDOW

ASSIGNEE: LAB B SERIAL ID: 2

ACCEPTANCE DATE: 2000/3/11

ACCEPTER: LAB A ACCEPTANCE ID: 1

ORDER

CUSTOMER: Ichiro Yamada

ADDRESS: fib.28

TEL.: 03-1234-1234

DESTINATION(2 Tokyo Convenience Store, Kawasaki Shop

| IMAGE No. | 1 | 2 | 2 | 3 | TOTAL |
|---|---|---|---|---|---|
| SIZE | REGULAR (@¥50) | REGULAR (@¥50) | A5 (@¥100) | REGULAR (@¥50) | |
| NUMBER OF PRINT(S) | | | 7 | 6 | |
| FEE | | | ¥700 | ¥300 | ¥1,000 |

REPORT

ACCEPTANCE D 2000/3/11

REPORT DATE

CURRENT STATUS:

| Status | | Report date | Time |
|---|---|---|---|
| | PRINTED | 2000/3/11 | 18:00 |
| | CARRIED | 2000/3/12 | 9:30 |
| V | DELIVERED | 2000/3/12 | 13:30 |

FIG.28

PROSECUTION REPORT FLOW

QUERY FLOW

PROSECUTION REPORT FOR ORDERS ASSIGNED BY LAB A

| SERIAL ID | ACCEPTANCE DATE | ACCEPTER | ACCEPTANCE ID | ASSIGNEE | FEE | ASSIGNMENT DATE | DELIVERY DATE | DELIVERY TIME | CURRENT STATUS |
|---|---|---|---|---|---|---|---|---|---|
| 2 | 2000/3/11 | LAB A | 1 | LAB B | ¥1,000 | 2000/3/11 | 2000/3/12 | 13:30 | DELIVERED |
| 3 | 2000/3/11 | LAB A | 1 | LAB C | ¥1,500 | 2000/3/11 | 2000/3/12 | 15:00 | DELIVERED |
| 6 | 2000/3/12 | LAB A | 2 | LAB B | ¥1,200 | 2000/3/12 | | | CARRIED |
| 15 | 2000/3/14 | LAB A | 6 | LAB D | ¥950 | 2000/3/15 | | | ASSIGNED |
| 18 | 2000/3/16 | LAB A | 7 | LAB B | ¥1,400 | | | | UNSETTLED |
| | | | | TOTAL | ¥6,050 | | | | |

FIG.31

BALANCE FOR LAB A

| SERIAL ID | ACCEPTANCE DATE | ACCEPTER | ACCEPTANCE ID | ASSIGNEE | TO PAY | TO BE PAID | BALANCE |
|---|---|---|---|---|---|---|---|
| 2 | 2000/3/11 | LAB A | 1 | LAB B | ¥1,000 | | |
| 3 | 2000/3/11 | LAB A | 1 | LAB C | ¥1,500 | | |
| 6 | 2000/3/12 | LAB A | 2 | LAB B | ¥1,200 | | |
| 7 | 2000/3/12 | LAB B | 2 | LAB A | | ¥3,000 | |
| 13 | 2000/3/14 | LAB D | 2 | LAB A | | ¥1,600 | |
| 15 | 2000/3/14 | LAB A | 6 | LAB D | ¥950 | | |
| | | | | TOTAL | ¥4,650 | ¥4,600 | ¥−50 |

FIG.32

PRINT SERVICE, ORDER ACCEPTANCE METHOD, AND COOPERATION SYSTEM AND METHOD

BACKGROUND OF THE INVENTION

This application is based upon and claims priority of Japanese Patent Applications No. 2000-69950 filed on Mar. 14, 2000, No. 2000-75767 filed on Mar. 17, 2000, and No. 2001-22259 filed on Jan. 30, 2001, the contents being incorporated herein by reference.

1. Field of the Invention

The present invention relates to services carried out by a plurality of cites, and more particularly to such services each for delivering product to destination designated by a customer.

2. Description of Related Art

In this field of the art, various types of service systems have been proposed. A service of accepting an order from a customer to make a print of digital image data is one of the typical services in this field of the art.

Japanese Laid-Open Patent Application No.10-13589 has proposed "to connect image input devices located at a plurality of shop fronts to a remotely located high speed image output device with transmission lines for transmitting a digital image which has been originated from a negative film or a print, to the output devices by way of a spooler at a remote laboratory for the purpose of producing extra print at a remote site."

Japanese Laid-Open Patent Application No.11-154218 has proposed that "a service center for accepting an order for print service is in communication through a network with mini-laboratories or a special laboratory located at various places, in which a center server of the service center selects and assigns a print producing laboratory the order in accordance with an order information from a customer transmitted through the network, whereby the print production can be carried out not by the center server, but by a desired laboratory."

Japanese Laid-Open Patent Application No.11-154218 has proposed that an order data including an image data and an delivery destination data is transmitted from a terminal of a customer through servers to a managing center controlling a plurality of laboratory systems corresponding to the destinations, the managing center specifying a laboratory system in accordance with the delivery destination data upon receiving the order data for the purpose of transmitting the order data to the laboratory system, which produces the print of the image in the order data and prints the destination on an envelope in accordance with the delivery destination data in the order data, the print being contained into the envelop.

Japanese Laid-Open Patent Application No.11-4311 has proposed another example of a network connection between an image handling terminal located at a site such as a photo service shop and a server computer for centrally managing digital images.

However, there have been problems and disadvantages still left in the related arts. For example, the related arts have not satisfactorily fulfilled the demand by the customers on the convenience and cost of the service.

SUMMARY OF THE INVENTION

In order to overcome the problems and disadvantages, the invention provides a cooperation system among a plurality of sites for print service. The system according to the invention is applied to a cooperation among a first printer at a first site where a first public transportation system is available for delivering the print, a second printer at a second site where a second public transportation system is available, and an acceptance site where an order is accepted from a customer to make a print of digital image data and to deliver the print to a designated destination. The acceptance site includes a computer deciding whether to assign the order to the first site or to the second site in dependence on which is the most convenient public transportation system to deliver the print to the designated destination.

Thus, the cooperation system according to the invention effectively makes use of the existing public transportation system available to each of the sites. The decider would decide not to assign the order to a site if its public transportation system is not available for carrying the print to the destination, but to assign the order to another site where its public transportation system is convenient for the destination. There would be no problem in the convenience of any transportation system between the acceptance site and the assignee site since the order assignment is easily carried out by means of transmitting the digital image data through a computer communication such as the Internet. The point is whether or not it is convenient for the assignee site to carry the print to the destination by way of its available public transportation system.

Specifically, it is recommendable for the assignee site to be located at a stop of the public transportation system, such as a station of a railroad. In this case the print is easily carried to any station on the railroad if the customer designates such a station as the destination.

The cooperation system above is applicable not to the two assignee sites, but to a cooperation among more cites for print service. Further, the acceptance site itself may have its own available public transportation system and include an own printer. In this case the acceptance site would decide not to assign the order to any other site if the own transportation system is the most convenient to deliver the print to the designated destination, but to carry out the print by the own printer. On the other hand, one of the above mentioned first and second sites may also be capable of accepting an order from a customer to make a print of digital image data and to deliver the print to a designated destination. In this case, one of the first and second sites also decides whether to assign the order to the other of the first and second sites or to the acceptance site in dependence on which is the most convenient public transportation system to deliver the print to the designated destination. Thus, every site can equally cooperate with each other without any definition such as the acceptance site or the assignee site.

According to another feature of the invention, the assignment of the order between the sites is made by way of a managing center with one of the following functions.

The managing center asks a site whether or not to accept an assignment of an order of a customer accepted at another site. And, the managing center records the order assignment if settled in response to an answer from the asked site.

The managing center receives a prosecution report from the assignee site as to the current status in prosecuting the assigned orders. And, the managing center reports the current status in response to a query from the assignor site.

The managing center receives from each cite accounts with another site caused by the order assignment. And the managing center balances all the accounts of each site with all the other sites, respectively, to calculate a lump sum for each site to adjust with the managing center. Thus, each site need not balance the accounts with the other sites individually, but with the managing center only. Practically, the managing center balances the accounts caused within a predetermined period to calculate the lump sum for the predetermined period.

The managing center divides a special order into a plurality of sub-orders, which are to be delivered to the plurality of destinations. The divided sub-orders are recorded as an independently managed order as well as an ordinary order with one destination of the delivery.

In ordering the print of the digital image data, a customer may directly appear at the acceptance site to hand the digital image data. Alternatively, the order may be accepted by way of a computer communication between a computer of the acceptance site and a personal computer of the customer.

In the case of order acceptance through the computer communication, the computer of the acceptance site provides the personal computer of the customer with a requirement of a plurality of kinds of data necessary for accepting the order. The computer of the acceptance site may provide buck the personal computer of the customer with a combined data composed of the plurality of kinds of data transmitted from the personal computer of the customer. With an assumption that the customer keeps the combined data, the computer of the acceptance site provides the personal computer of the customer with a requirement of the combined data in place of the plurality of kinds of data upon the next order from the same customer. The computer of the acceptance site divides the combined data transmitted form the personal computer of the customer into the plurality of kinds of data necessary for accepting the order. This makes it easy for the familiar customer to order the print next time since the customer is free from a burden of inputting the plurality of kinds of data one by one.

The cooperation system according to the invention, especially with the managing center is applicable not only to the print service site, but also a plurality of sites for service of general goods, products or works.

Other features and advantages according to the invention will be readily understood from the detailed description of the preferred embodiment in conjunction with the accompanying drawings.

BRIEF DESCRIPTION OF THE DRAWINGS

FIG. 21 represents data input form to be displayed on the computer of the laboratory system.

FIG. 23 represents a table showing a list of all order data collected by the managing center.

FIG. 24 represents a table showing the structure of the account charged on the customers.

FIG. 25 represents a table showing a simplified list of order data collected by the managing center according to a modified embodiment.

FIG. 26 represents a list of all the orders that relates to one laboratory system, which are extracted from the database of FIG. 23.

FIG. 27 represents a list of all the orders that one laboratory system is to carry out the print/delivery services, which are also extracted from the database of FIG. 23.

FIG. 28 represents data input form to be displayed on the computer of the laboratory system upon reporting the current status of an assigned order.

FIG. 31 represents a list of the prosecution management information that is output in response to the query from a laboratory system.

FIG. 32 represents a list of the accounts balance information for a laboratory system.

DETAILED DESCRIPTION OF THE PREFERRED EMBODIMENT

Figure 1:
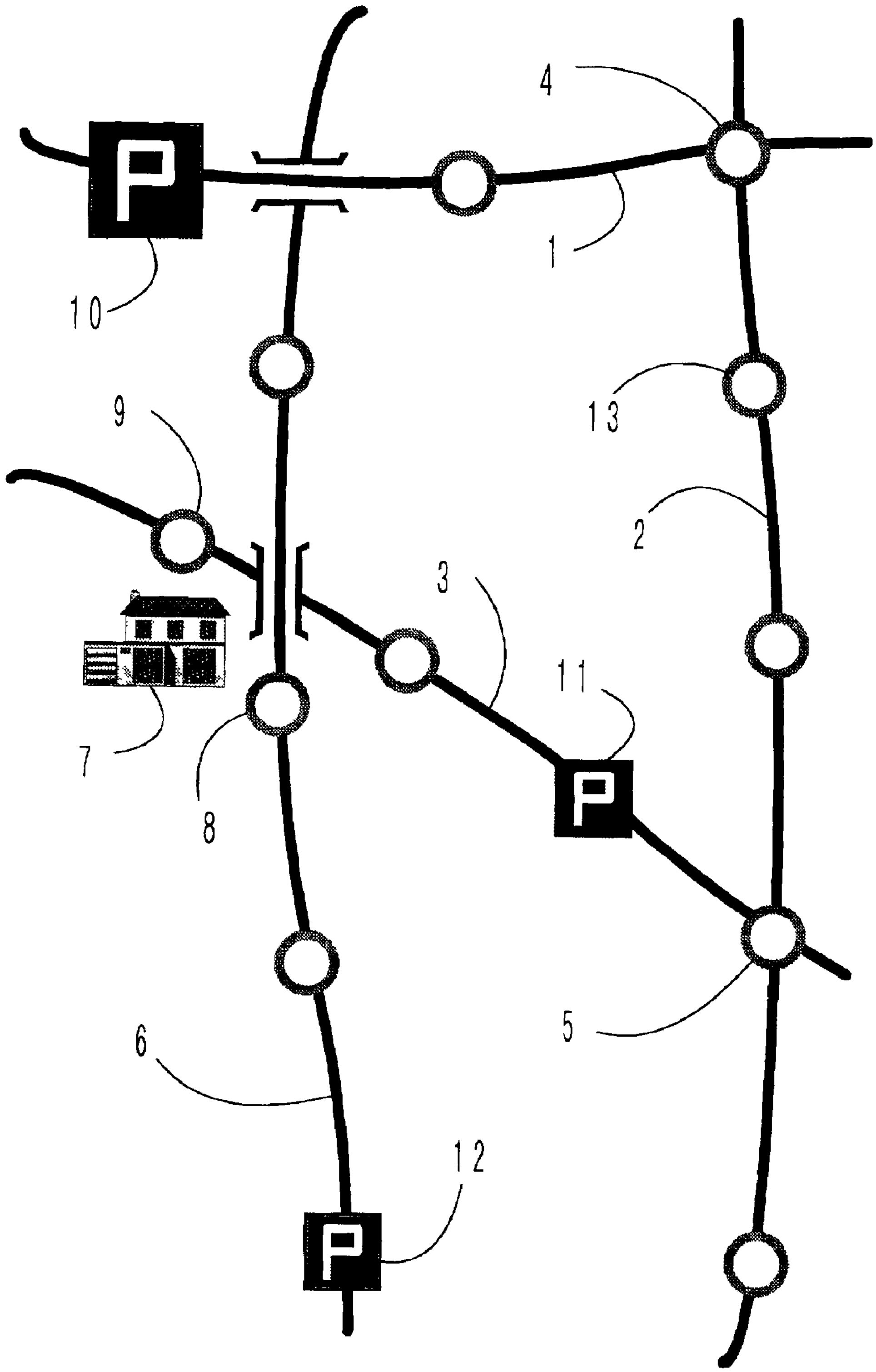
FIG. 1 represents a route map of a public transportation system according to the first embodiment of the present invention.

FIG. 1 represents a route map of a public transportation system according to the first embodiment of the present invention. The public transportation system according to the present invention means a governmental railroad, a municipal railroad, a subway, a nongovernmental railroad, a monorail, a bus line, or an airline. Though the first embodiment is explained on relationships among railroads and stations, the present invention can be applicable to various types of public transportation systems such as mentioned above and their stops. The stop means a station in the case of the railroad, a bus stop in the case of the bus line, and an airport in the case of the airline.

In FIG. 1, lines 1, 2 and 3 are all managed by company A and interconnected with each other at stations 4 and 5, respectively. On the other hand, line 6 is separately managed by company B and not interconnected with any of the lines managed by company B. Station 8 on line 6 of company B is the nearest one from home 7 of a customer. Station 9 on line 3 of company A is also located at almost the same distance from home 7 as that of station 6.

A server computer and a main printer of a silver halide type are located in station 10 on line 1 of company A. On the other hand, a local computer and a silver halide type printer are located in each of station 11 on line 3 of company A and in station 12 on line 6 of company B. Computers at stations 10, 11 and 12 are in communication through a private line or the Internet.

The print delivery system according to the present invention will be explained on the basis of the above mentioned railroad network.

At the beginning, the customer is to give an order for prints of digital image data by means of a personal computer in home 7 through the Internet with the delivery of the prints at station 8 requested. The order data for prints and the digital image data are to be received at the server computer in station 10 on line 1 of company A. In accordance with the contents of the order data, the server computer is to decide whether or not to transmit the order data and the digital image data to one of the local computers, and to identify the local computer if the data is to transmitted thereto. In other words, the server computer is to transmit the order data and the digital image data to a local computer in the station on a line that includes the station where the delivery of the prints is requested. In this case, the server computer transmits the order data and the digital image data to a local computer in station 12 on a line 6 since the delivery of the prints is requested at station 8.

In station 12, the silver halide printer is to produce the ordered prints under the control of the local computer. The finished prints are to be carried from station 12 to station 8 by a train running on line 6. The finished prints arrived at station 8 is to be handed to a shop in station 8, where the customer is to finally receive the finished prints on the way back to home 7 for example.

Contrary to the above, it may be possible to produce the prints by means of the main printer in station 10 itself and to carry the finished prints directly to station 8 or home 7 by a truck courier service or the like. In this case, however, an extra delivery system and cost would be necessary. By transmitting the data from station 10 to station 12, on the other hand, the embodiment according to the present invention fully makes use of the existing route from station 12 to station 8 on line 6, which is extremely less expensive. This is the reason why the print is carried out in station 12, which is farther from home 7 than station 10 is.

If the customer desires to receive the finished prints at station 4 on line 1 according to another convenience, the main printer in station 10 itself carries out the prints, which is carried from station 10 to station 4 by a train running on line 1.

The customer may desire to have a friend receive the finished prints at station 13 on line 2 for example, where the friend of the customer usually gets off the train. Line 2, however, has no station with a local computer and a printer. In this case, one way of delivery at station 13 is to produce the prints by means of the main printer in station 10, to carry the prints from station 10 to station 4 by a train running on line 1, and to transfer the prints at station 4 to another train, which runs from station 4 to station 13 on line 2. Another way of delivery is to transmit the order data and the digital image data from the server computer in station 10 to the local computer in station 11 on line 3, to produce the prints by means of the printer in station 11, to carry the prints from station 11 to station 5 by a train running on line 3, and to transfer the prints at station 5 to another train, which runs from station 5 to station 13 on line 2. It depends on delivery conditions such as the capacity of the printer or the time schedule of the train whether the first mentioned way or the second one is preferred. The necessity of the transfer between trains would increase cost and time for delivery because someone has to do the job unless an automated transferring system is prepared in the station. If any of the stations on line 2 were provided with a local computer and a printer, no one would be necessary to do the job of the transfer. Such a provision of a local computer and a printer for the station on line 2 would be considered in dependence on the cost of the provision and the frequency of the delivery at one of the stations on line 2.

Other than the above mentioned case in which the customer at home 7 orders prints from the personal computer, the customer on a visit to some place can also order prints from a handy phone through the Internet in the similar manner. In this case, the order data and the digital image data are initially received by the server computer in station 10 on line 1 of company A to finally deliver the finished print at station 8, where the customer coming home is to receive the prints.

Figure 2:
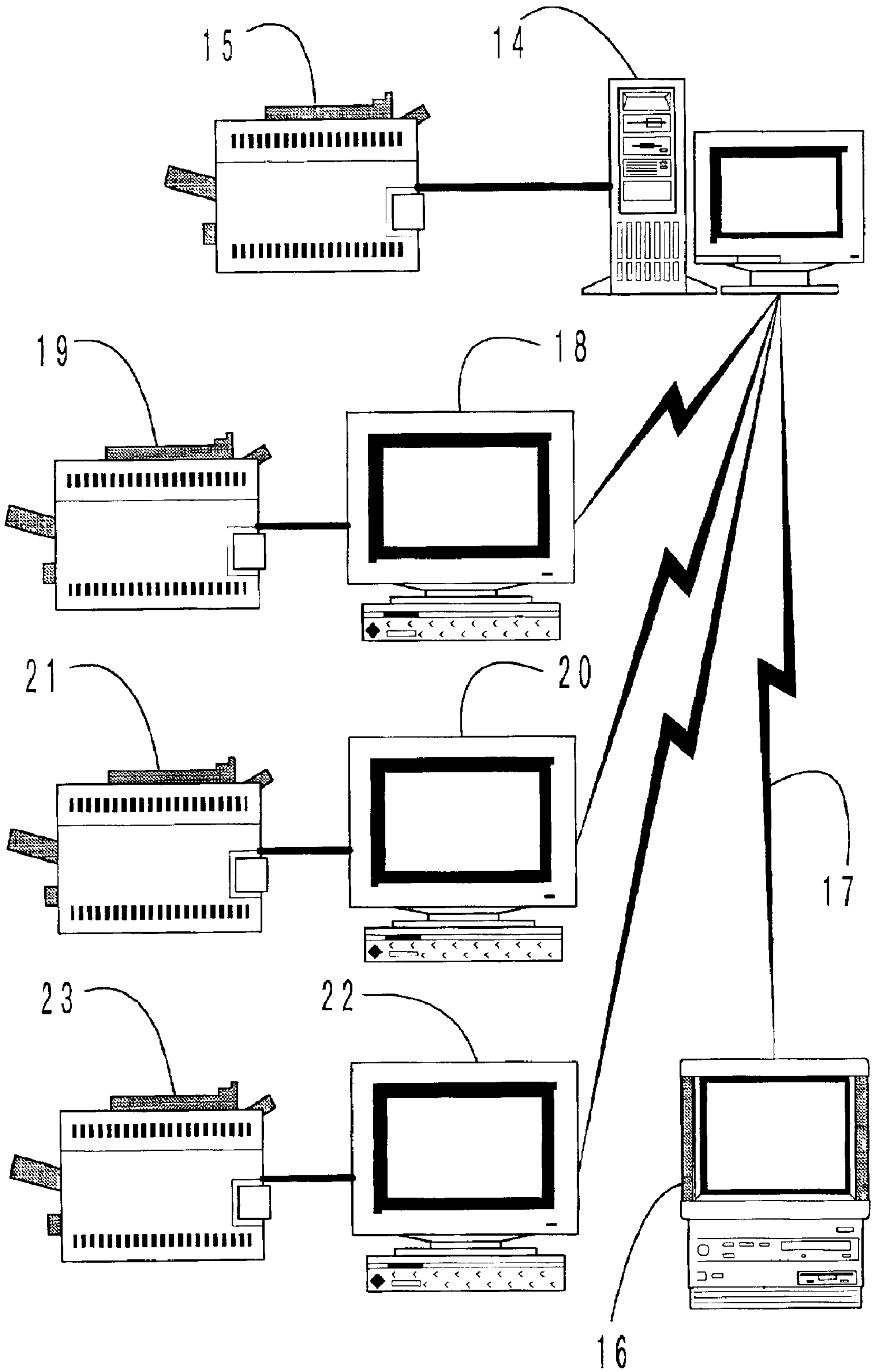
FIG. 2 represents a computer network system according to the first embodiment of the present invention.

FIG. 2 represents a computer network system according to the first embodiment of the present invention. Server computer 14 is connected to main printer 15 of silver halide type in station 10. Personal computer 16 at home 7 of the customer transmits the order data and the digital image data to server computer 14 through the Internet 17. Other than such a telecommunication, server computer 14 can get the order data and the digital image data by means of a manual input at station 10 where a customer directly visits with a memory medium such as a memory card storing the digital image data.

Local computer 18 and silver halide printer 19 connected thereto are located in station 11, local computer 20 and silver halide printer 21 in station 11, and local computer 22 and silver halide printer 23 in a station not shown in FIG. 1. Server computer 14 and each of local computers 18, 20 an 22 are in communication with each other through the Internet. Alternatively, the communication in the system may be carried out by means of an internal telecommunication network. Especially, it is advisable to fully make use of the existing communication systems which railroad companies possess for managing the movement of their trains.

Figure 3:
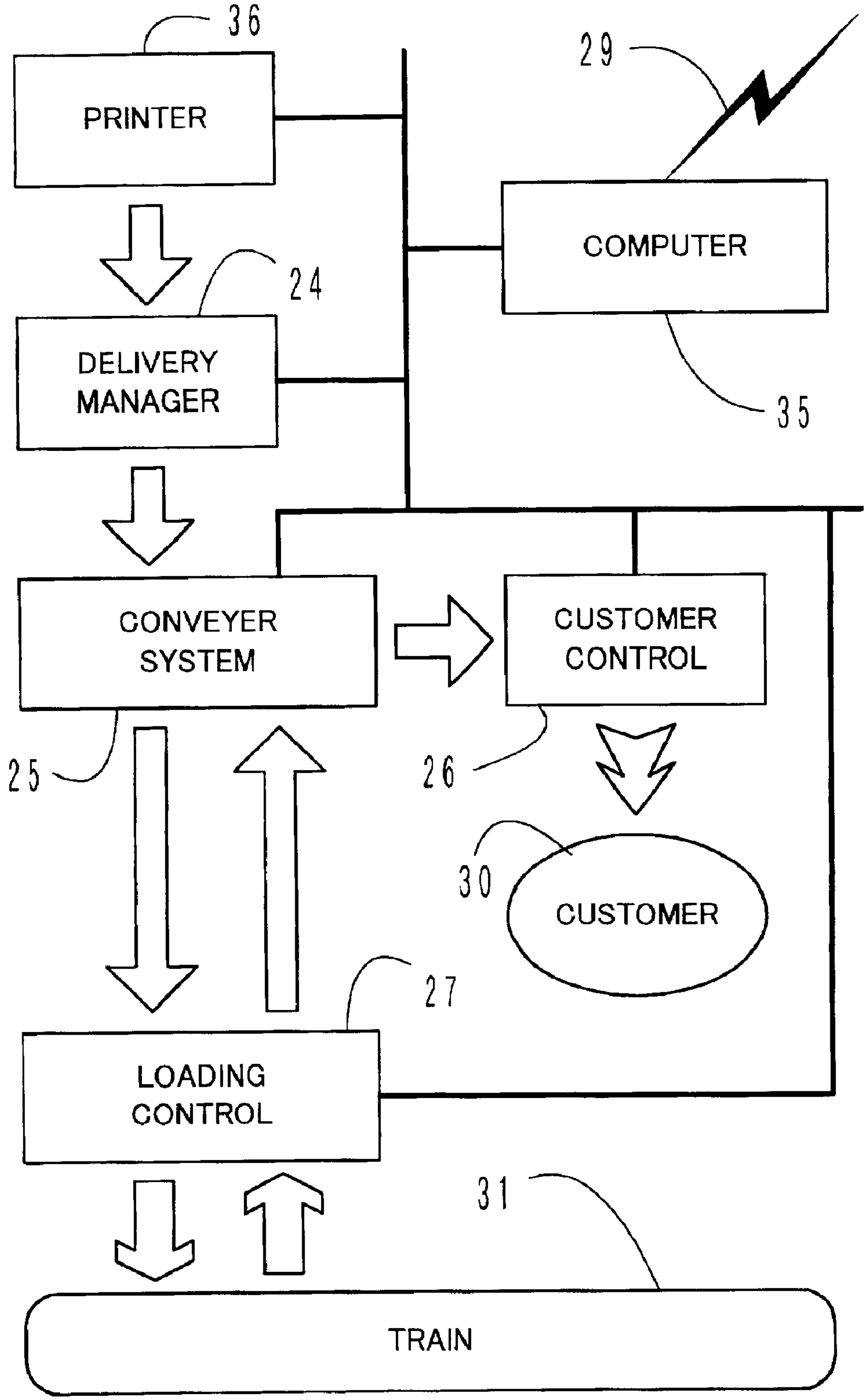
FIG. 3 represents a block diagram of the system in the station according to the first embodiment of the present invention.

FIG. 3 generally represents a block diagram of the system in the station such as stations 10, 11 and 12, which is provided with the computer and the printer. In the case of station 10 for example, computer 35 corresponds to server computer 14, and printer 36 to main printer 15 of silver halide type. Computer 35, printer 36, delivery manager 24, and conveyer system 25, customer control 26 and loading control 27 are connected to LAN 28.

Computer 35 as the server computer is in communication with local computers through the Internet 29. If customer 30 wants to directly receive the prints at station 10, the prints are handed over at customer control 26. On the other hand, train 31 receives the prints from loading control 27 located at the platform to carry them to a station other than station 10, where a customer desires to receives the prints.

The functions of the system in the station will be explained in detail according to some cases. If a delivery of the prints at station 10 is desired, prints finished by printer 36 are transferred to delivery manager 24, which prepares containers such as envelopes and puts the prints into a predetermined one of the envelopes. Delivery manager 24 has printed on the envelope various data such as the name and ID of the customer, the delivery station, and the need to transfer the train, with a receipt form for proving the delivery also prepared. The data may be represented by characters, bar codes, or marks detection systems. In place of the printing of such visual representations, magnetic data recording system may be applicable if the envelope and the receipt form have magnetic recording areas.

The envelope containing the prints is transferred to conveyer system 25 together with the receipt form. Conveyer system 25 detects the data of the delivery station and the need to transfer the train for determining the destination. Since the destination is station 10 in this case, the prints in the envelope and the receipt form are conveyed to customer control 26. When customer 30 who comes for the prints receives the envelope, the receipt form is filled by the customer and returned to customer control 26, where the data in the receipt form is input and transmitted to computer 35.

Now, another case in which the destination is not station 10 but another station on the same line 1 will be explained. Also in this case, prints finished by printer 36 are transferred to conveyer system 25 by way of delivery manager 24. However, conveyer system 25 that detects the data of the delivery station and the need of transfer determines to convey the envelope and the receipt form to loading control 27 in this case. Loading control 27 at the platform covers up and down trains. Further, a plurality of loading controls 27 are prepared in case that station 10 includes a plurality of platforms for providing each of the platforms with loading control 27. In this case, conveyer system 25 identifies a specific one of the loading controls 27 to which the envelope and the receipt form are surely conveyed by means of detecting the data of the destination. Loading control 27 identifies one of the up and down trains through the data of delivery station and the need of transfer for loading the envelope and the receipt form on a suitable train 31. The actual loading job may be carried out by a sophisticated automation of the loading control 27 or by the aid of a conductor.

Various trains for different destinations may stop at the same platform even if the direction itself is the same. Even in such a circumstance, loading control 27 is programmed to identify the correct train 31 that is scheduled to stop at the designated station without confusion.

By train 31, the envelope and the receipt form arrive at the destination, where the customer receives them and returns the filled receipt form. At the station where the customer receives the prints, the returned receipt form is loaded on a train for returning the receipt form to station 10 through the reverse way. When the train arrives at station 10, the returned receipt form is unloaded to loading control 27 and transferred to conveyer system 25, which identifies it as the returned receipt form for conveying it to customer control 26. At customer control 26, the data in the receipt form is input and transmitted to computer 35 for proving the correct delivery.

If the case is that the destination is not on line 1, but station 8 on line 6, the prints are not finished in station 10. But, computer 35 transmits through the Internet 29 the order data and the digital image data to local computer 20 in station 12 on line 6 that includes station 8 where the delivery of the prints is requested.

The system in FIG. 3 can be applied to station 12. In this case, computer 35 corresponds to local computer 20, and printer 36 to silver halide printer 21. Computer 35 receives the order data and the digital image data from server computer 14 through the Internet 29. On the basis of the received data, printer 36 finishes the prints, which are transferred to delivery manager 24. Delivery manager 24, conveyer system 25, customer control 26 and loading control 27 function in the same manner as has been explained with respect to station 10.

The manner of handling the returned receipt form in station 12, however, somewhat differs from that in station 10. The steps of unloading the returned receipt at loading control 27 and transferring it by means of conveyer system 25 to customer control 26 are identical. But, the data of the receipt form input at customer control 26 and transmitted to computer 35 is further transmitted from local computer 35 to server computer 14 through the Internet 29. Server computer 14 proves the correct delivery on the basis of a comparison between the internal delivery record and the data transmitted from local computer 35 to complete the delivery case.

Figure 4:
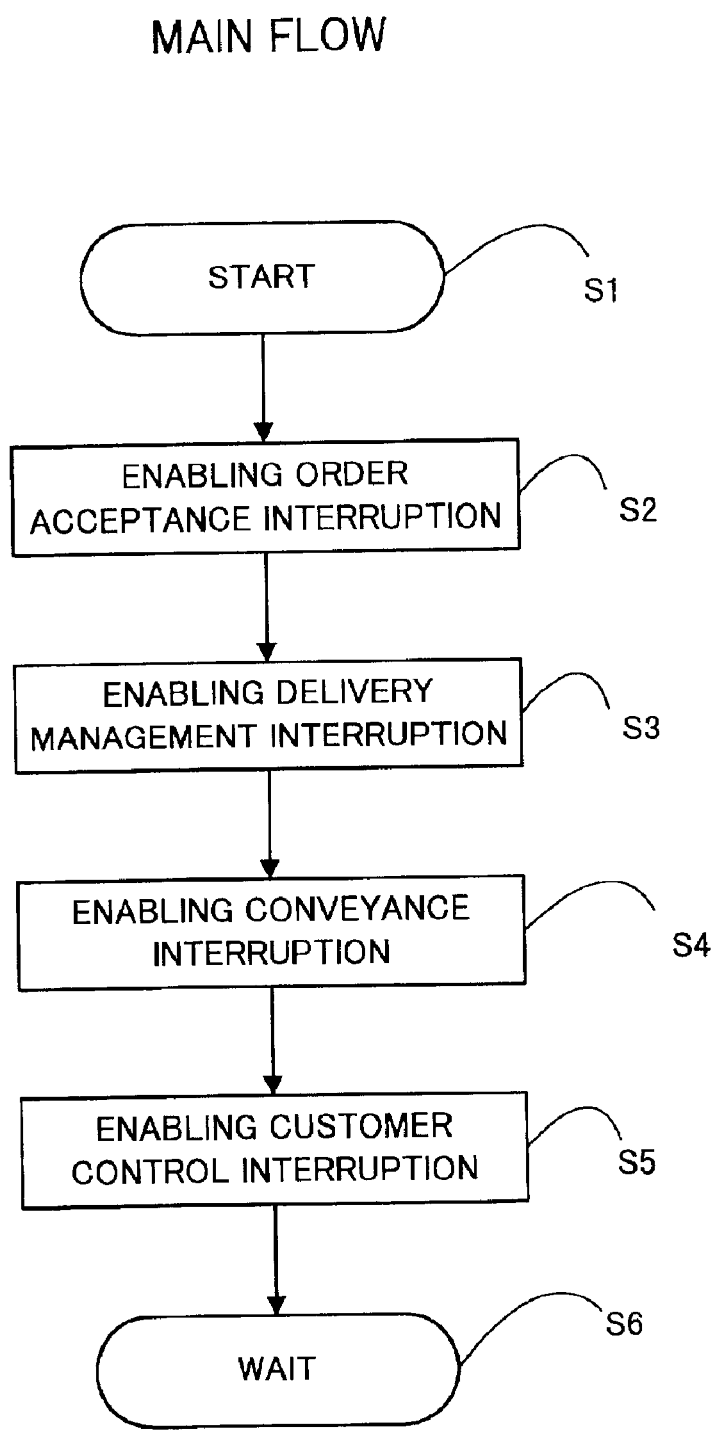
FIG. 4 represents a flow chart showing the main flow that is commonly applicable to the server computer and the local computer according to the first embodiment of the present invention.

FIG. 4 represents a flow chart showing the main flow that is commonly applicable to the server computer and the local computer. Starting with step S1, the flow enables order acceptance interruption in step S2, delivery management interruption in step S3, conveyance interruption in step S4, and customer control interruption in step S5. On completion of the various interruptions above, the flow comes into a waiting status in step S6.

Figure 5:
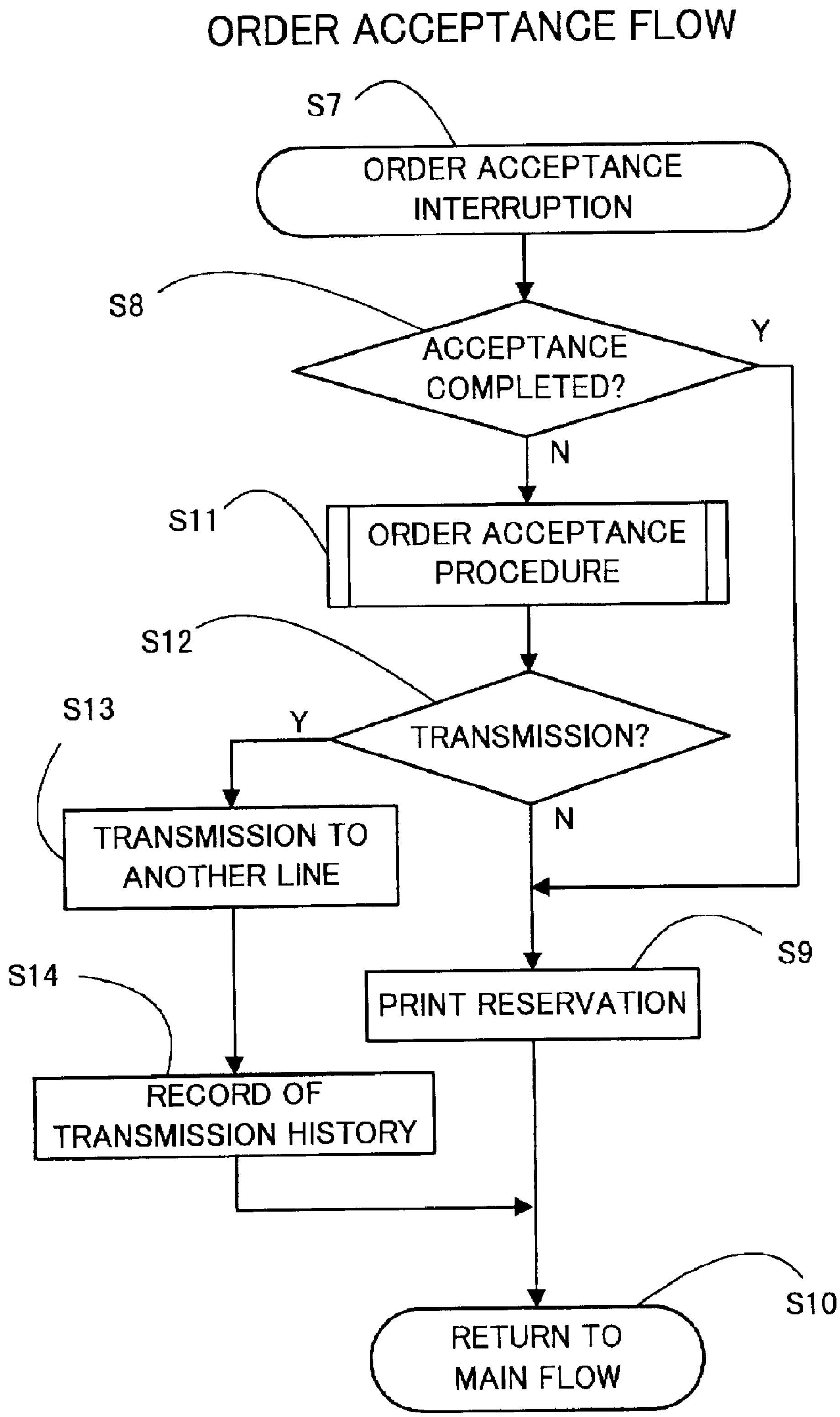
FIG. 5 represents a flow chart showing the process of order acceptance according to the first embodiment of the present invention.

FIG. 5 represents a flow chart showing the process of order acceptance, which is commonly applicable to the server computer and the local computer. In step S7, the order acceptance interruption is caused by an access for order from a personal computer of a user in the case of server computer 14. In the case of local computer 20, on the other hand, a receipt of the order data and the digital image data from server computer 14 causes the order acceptance interruption. In step S8, it is checked whether or not a order acceptance procedure has been completed. In the case of the local computer 20, the answer is always “YES” to go to step S9, where the print of the digital image data on the basis of the order data is reserved at silver halide printer 21. And, the flow returns to the main flow in step S10.

In the case of server computer 14, on the contrary, the flow goes to step S11 for the order acceptance procedure since the answer to the query in step S8 is “NO”. Step S12 checks the result of the order acceptance procedure to determine whether or not a data transmission to another railroad line is necessary. If the answer is “NO”, the flow goes to step S9 to make the print reservation at silver halide printer 21, followed by the return to the main flow in step S10.

If the answer to the query in step S12 is “YES”, on the contrary, the flow goes to step S13 to transmit the order data and the digital image data to a suitable local computer on another line. The history of data transmission is recorded in step S14, followed by the return to the main flow in step S10.

Figure 6:
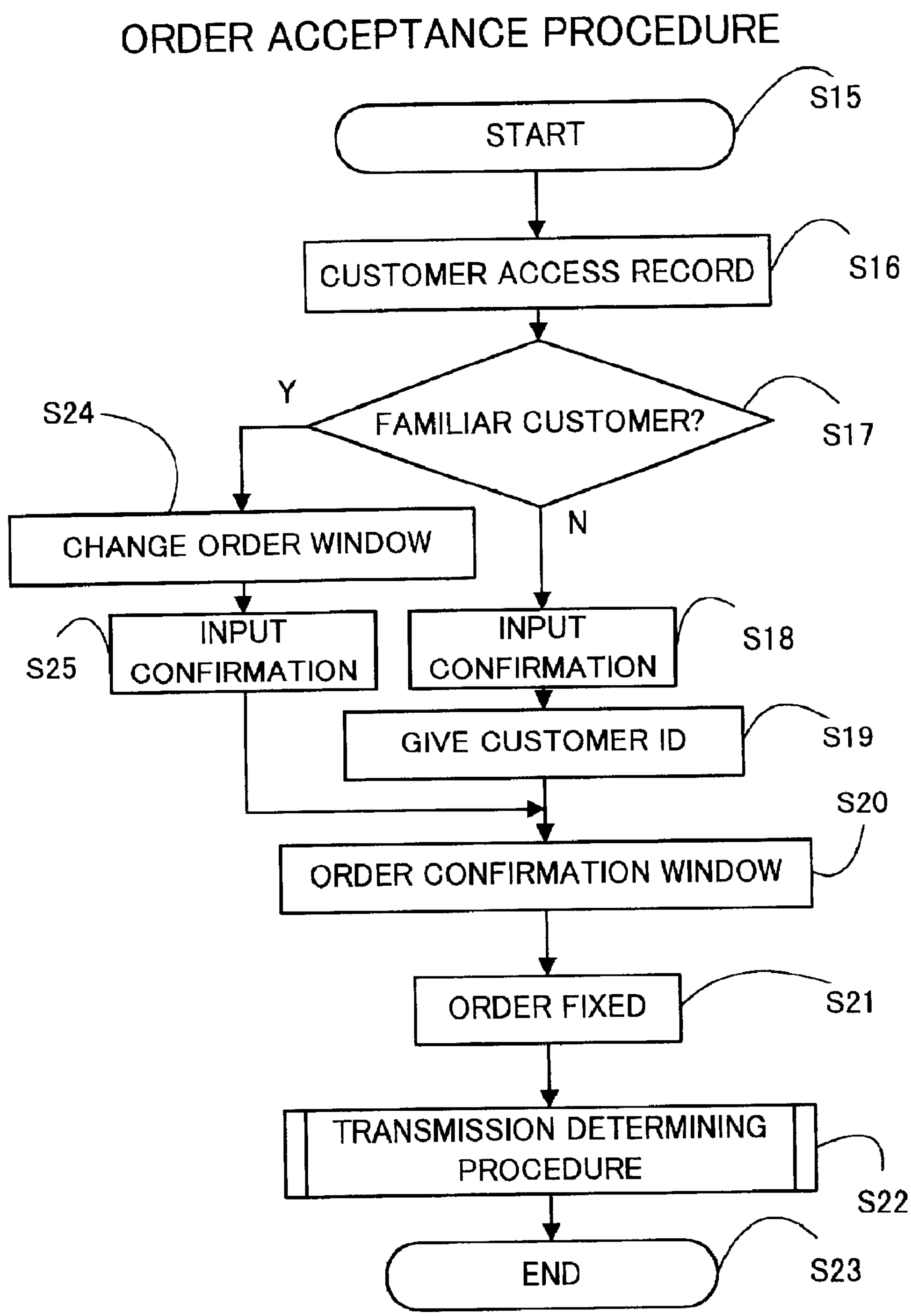
FIG. 6 represents a flow chart showing the details of the order acceptance procedure in FIG. 5.
Figure 7:
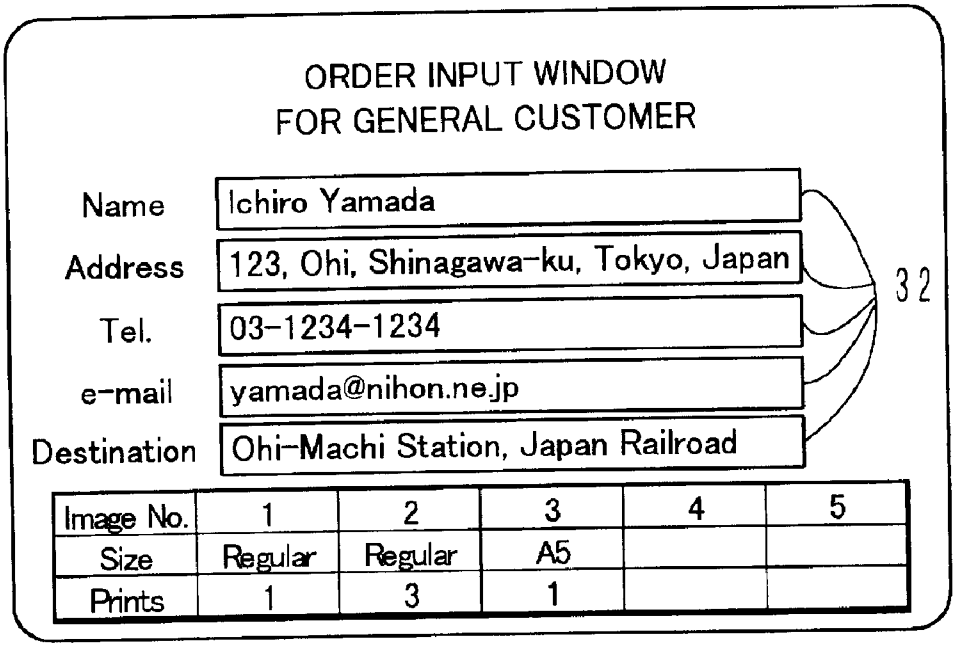
FIG. 7 represents an order input window displayed on a computer of a general computer.

FIG. 6 represents a flow chart showing the details of the order acceptance procedure in step S11 in FIG. 5. Starting with step S15, the access from user is recorded in step S16. Step S17 checks whether or not the accessing user is a familiar customer who has ever made an order. Meanwhile, an order input window for a general customer as shown in FIG. 7 is being displayed on a computer of the customer. If the user is a new customer without any record of order, the flow will go down and wait until the user completes the order on window in FIG. 7, which includes a plurality of data items 32 to be filled one by one. In step S18, the plurality of data items are individually checked and processed to issue in step S19 a user ID (Identification), which is an additional data for managing the order. The plurality of the input data as well as the user ID are combined into an integral data and displayed in step 20 within a order confirmation window as in FIG. 8.

Figure 8:
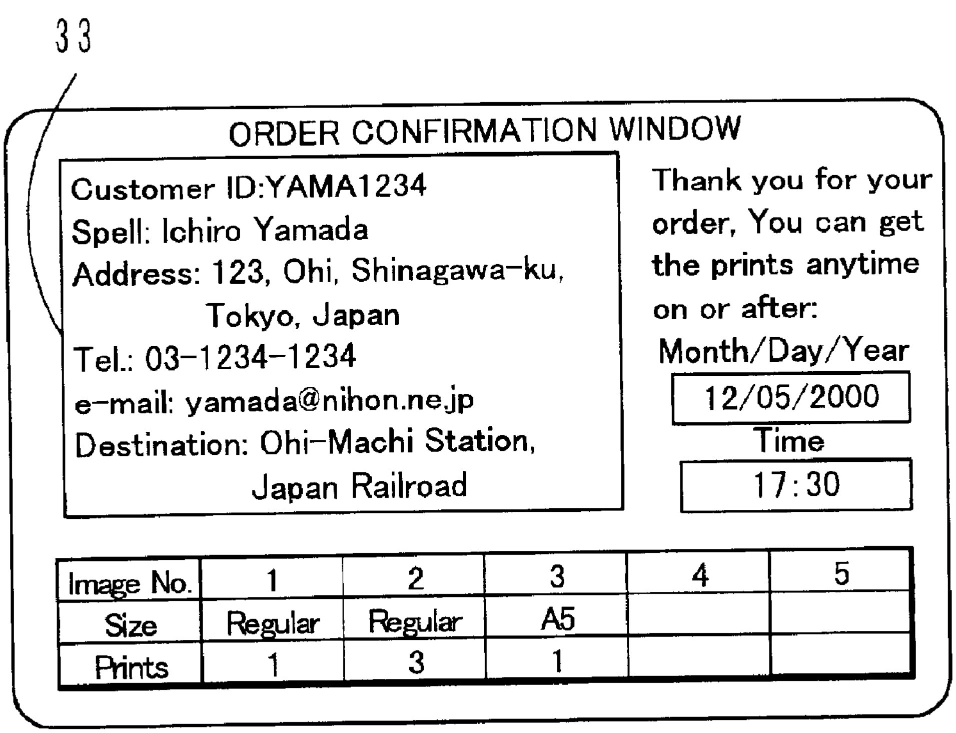
FIG. 8 represents an order confirmation window displayed on a computer of the customer.

As shown in FIG. 8, the order confirmation window includes window 33 of a single area for displaying the integral data. If the user will confirm the contents of the order on the order confirmation window, the order is completed in step S21 to record the order data and the digital image data into server computer 14. In step S22, server computer 14 conducts a transmission determining procedure to determine the necessity of data transmission and the way thereof if necessary, followed by the end of the data acceptance procedure in step S23.

Figure 9:
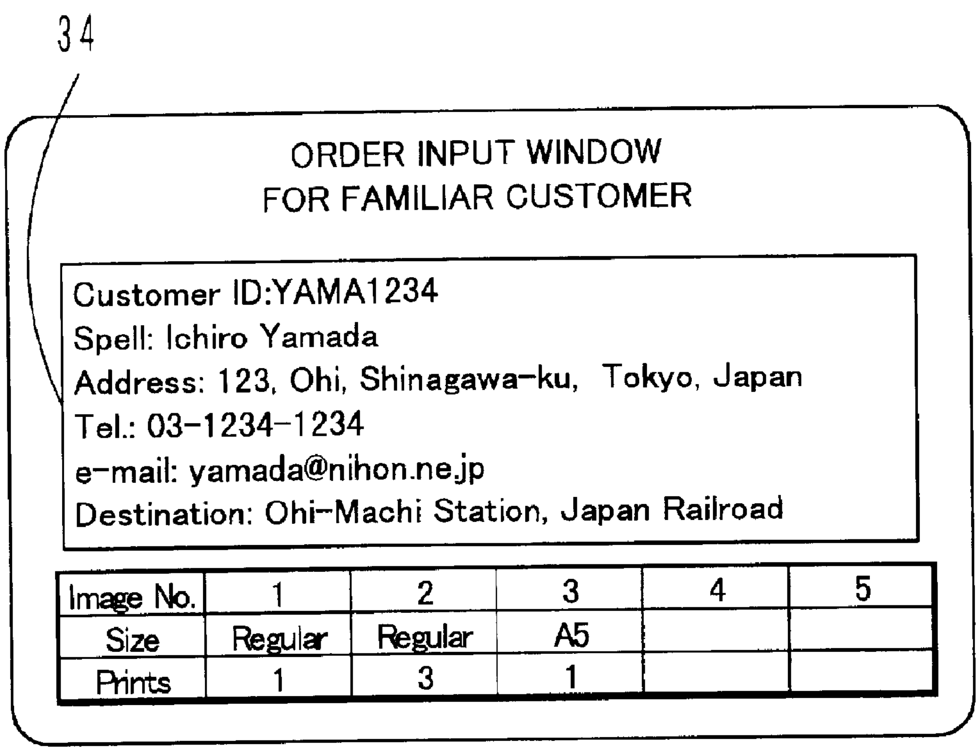
FIG. 9 represents a convenient order input window for a familiar customer.

If the step S17 determines that the user is a familiar customer who has been recorded, on the contrary, the flow goes to step S24, in which the order window is changed into a convenient order input window for a familiar customer. As in FIG. 9, the convenient order input window includes window 34 of a single area to be filled at once with the integral data that is a combination of the plurality of data items. The integral data appears in window 33 within the order confirmation window as in FIG. 8. If the user has copied the integral data from window 8 upon the first access for order and stored it in his or her computer, the user can easily retrieve the integral data and paste it on window 34 in FIG. 9 upon the second access for order. Since the plurality of data items are usually unchanged, the window 34 utilized in the above manner will avoid the process of filling the plurality of data items 32 one by one as in FIG. 7. In step 25, the integral data is divided into each of the plurality of data items, which are individually checked and processed. Upon the completion of the process in step S25, the flow goes to step S20, in which the integral data is displayed on the monitor of the user's computer as in the case of the new customer, followed by the same steps S21 to S23.

Figure 10:
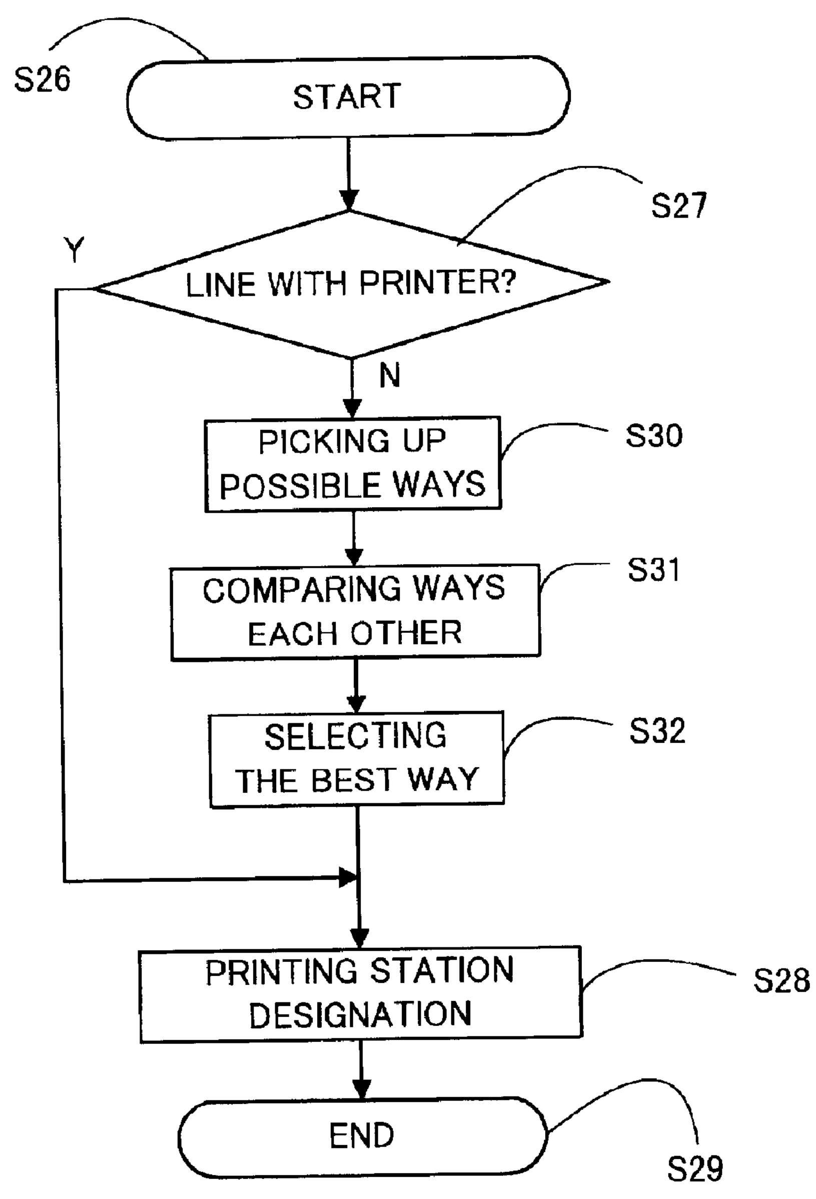
FIG. 10 represents a flow chart for the detail of the transmission determining procedure in FIG. 6.

FIG. 10 represents a flow chart for the detail of the transmission determining procedure in step S22 in FIG. 6, which is to determine the necessity of data transmission and the way thereof if necessary. Beginning with step S 26, it is checked in step S27 whether or not the line including the station where the customer requests to receive the finished prints also includes a station provided with a local computer and a silver halide type printer. If the answer to the query is "YES", the flow jumps to step S28, where the station is designated as the place of carrying out the prints. The flow is then completed in step S29.

If the answer to the query is "NO", on the other hand, the flow advances to step S30 to pick up possible delivery ways. In detail, an example on FIG. 1 is to be considered, in which the customer requests to receive the prints at station 13 on line 2 that includes no station provided with a local computer and a silver halide type printer. In this case, one delivery way is to carry out the printing with the main printer in station 10 on line 10 for carrying the prints from station 10 to station 4, where the prints are transferred to a train on line 2 so as to be carried from station 4 to station 13. Another delivery way is to carry out the printing with the silver halide printer in station 11 on line 3 for carrying the prints from station 11 to station 5, where the prints are transferred to a train on line 2 so as to be carried from station 5 to station 13. Those possible delivery ways are compared with each other in step S31 in FIG. 10 with conditions such as tasks on the printers and the time schedule of the trains taken into consideration to select the most convenient delivery way in step 32. After the selection, the flow advances to step S28, where a station is designated as the place of carrying out the prints in accordance with the selected delivery way. The flow then reaches step S29 to complete the transmission determining procedure.

Figure 11:
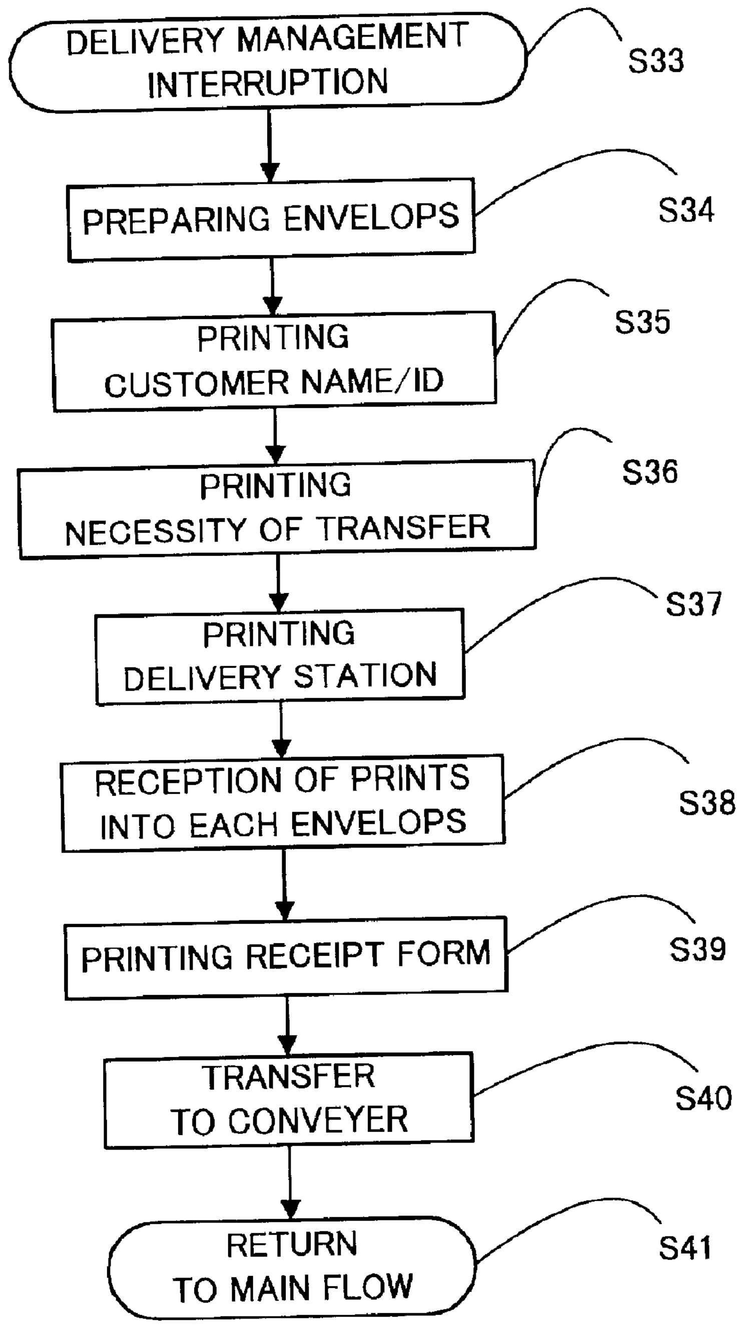
FIG. 11 represents a flow chart showing the function of delivery manager in FIG. 3.

FIG. 11 represents a flow chart showing the function of delivery manager 24 of the system in the station shown in FIG. 3. The delivery management interruption in step S33 is caused by the transfer of the finished prints from printer 36 to delivery manager 24. In step S34, an envelope serving as a container of the prints is prepared with respect to each of the customers. On the individual envelope, the name of the customer along with its identification number is printed in step S35. Also the data of necessity of transfer at a station and the identification of delivery station are printed on the individual envelope in steps S36 and S37, respectively. The individual envelope receives the corresponding prints for containing the same therein in step S38. On the other hand, the receipt form for proving the delivery is printed out in step S39. The prints in the envelope and the receipt form are transferred to conveyer system 25 in step 40. Then, the flow returns to the main flow in step S46.

Figure 12:
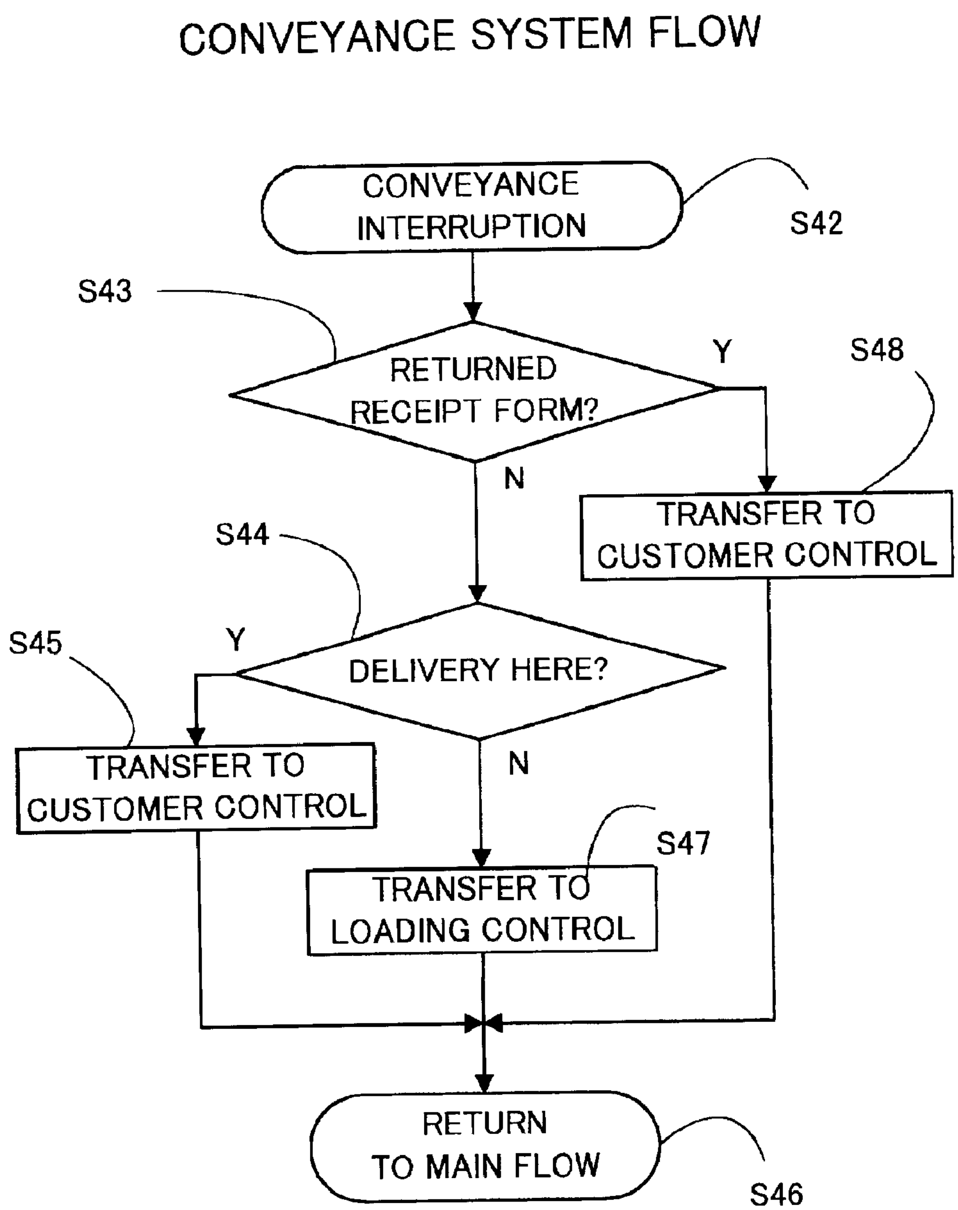
FIG. 12 represents a flow chart showing the function of conveyer system in FIG. 3.

FIG. 12 represents a flow chart showing the function of conveyer system 25 of the system in the station shown in FIG. 3. The conveyance interruption in step S42 is caused by the transfer of prints in the envelope and the receipt form from delivery manager 24 to conveyer system 25. Alternatively, the transfer of the returned receipt form from loading control 27 to conveyer system 25 can also cause the conveyance interruption in step S42. In step S43, the cause of the conveyance interruption is identified. If it is not the case that only the receipt form is transferred to conveyer system 25, it is decided that prints in the envelope and the receipt form are transferred from delivery manager 24. In this case the flow advances to step S44, where the data of necessity of transfer at a station and the identification of delivery station are checked to determine whether or not the delivery is carried out at the same station as the station where the prints have been finished. If the answer is "YES", the prints in the envelope and the receipt form are transferred to customer control 26 in step S45, and the flow returns to the main flow in step S46.

If the answer in step S44 is "NO", on the other hand, the prints in the envelope and the receipt form are transferred to loading control 27 in step S47.

Further, if it is determined in step S43 that only the receipt form is transferred to conveyer system 25, the returned receipt form is transferred from conveyer system 25 to customer control 26 in step S48, and the flow returns to the main flow in step S46.

Figure 13:
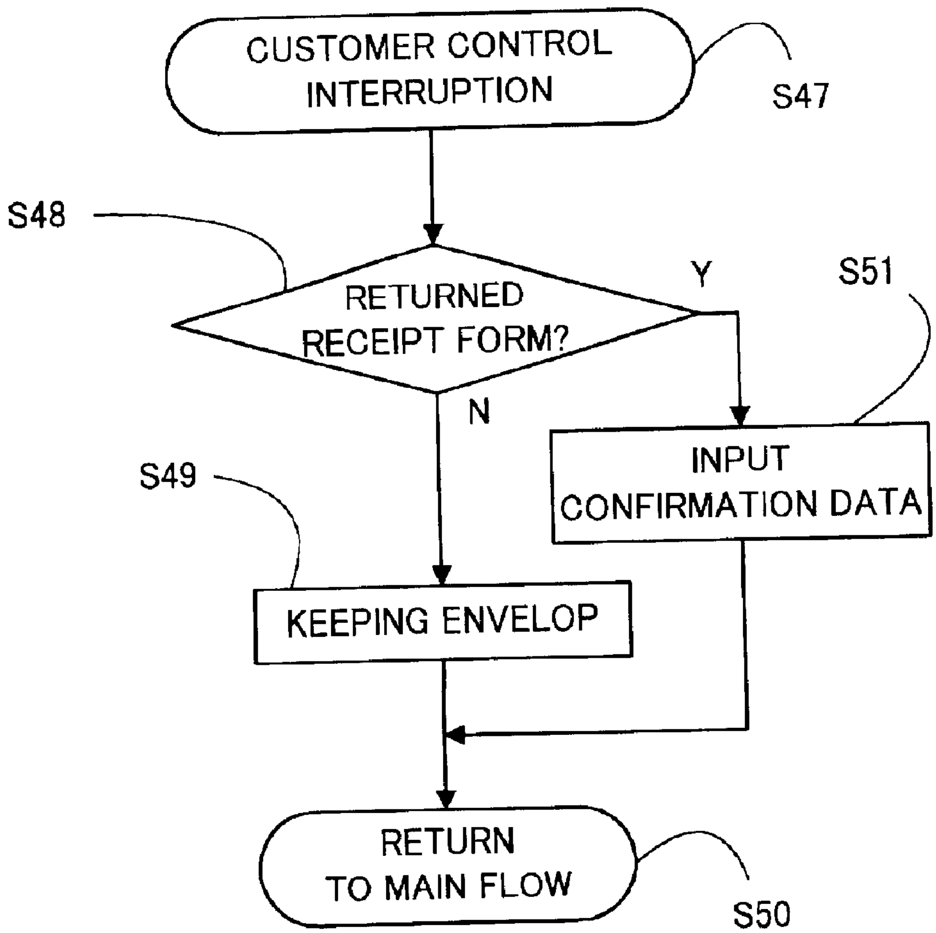
FIG. 13 represents a flow chart showing the function of customer control in FIG. 3.

FIG. 13 represents a flow chart showing the function of customer control 26 of the system in the station shown in FIG. 3. The customer control interruption in step S47 is caused by the transfer of prints in the envelope and the receipt form from conveyer system 25 to customer control 26. Alternatively, the transfer of the returned receipt form from conveyer system 25 to customer control 26 can also cause the customer control interruption. In step S48, it is checked whether or not the returned receipt is transferred. If the answer in step S48 is "NO", it is considered that the prints in the envelope along with the receipt form is transferred. In this case the envelope along with the receipt form are kept at customer control 26 in step S49 for waiting for the coming customer, and the flow returns to main flow in step S50. On the other hand, if the answer is "YES", which means that the receipt form is returned to confirm the receipt, the data of receipt confirmation is input in step S51, and the flow returns to the main flow in step S50.

Figure 14:
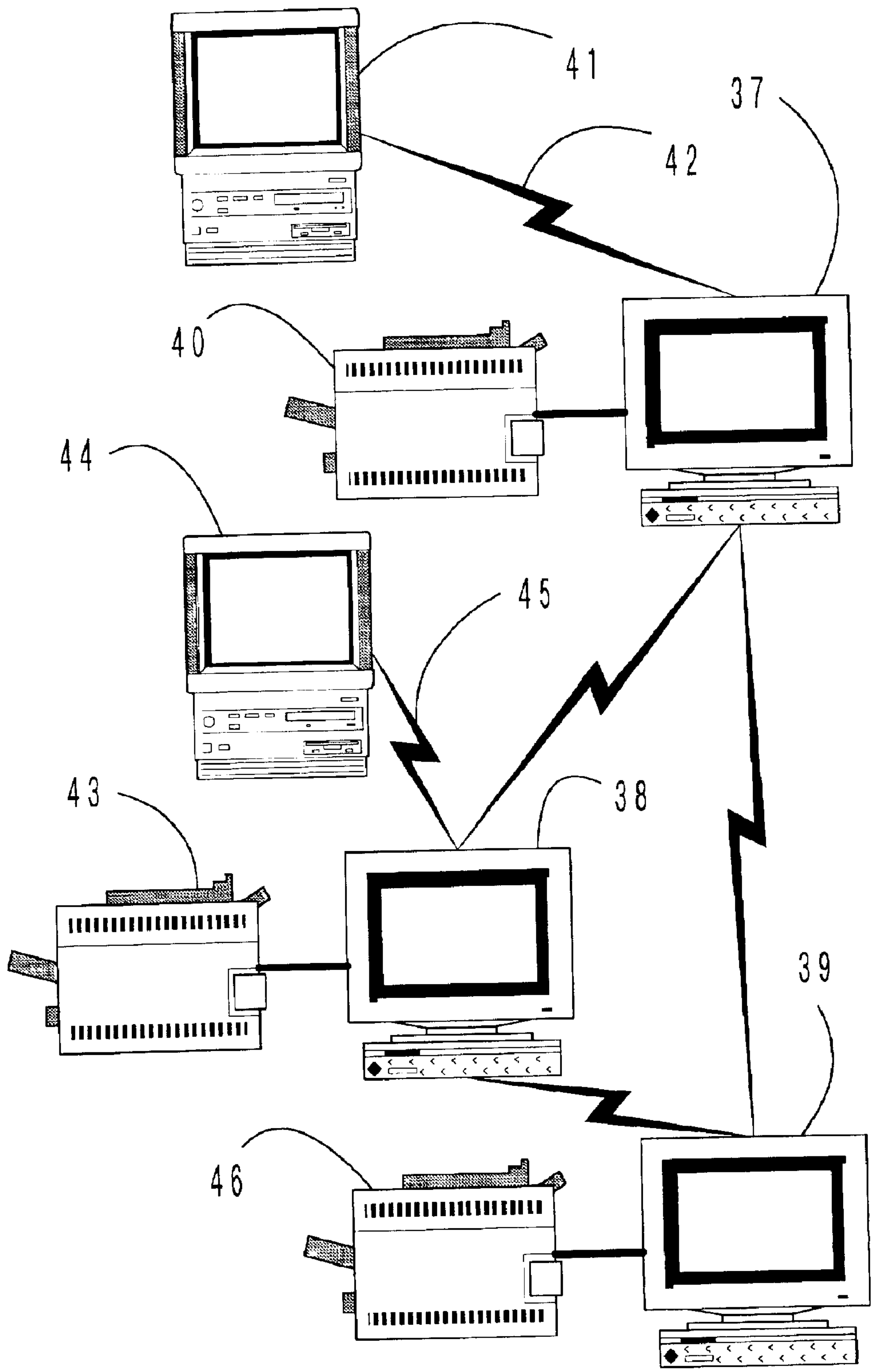
FIG. 14 represents a computer network system according to the second embodiment of the present invention.

FIG. 14 represents a computer network system according to the second embodiment of the present invention. In the second embodiment, all of computers 37, 38 and 39 can serve as the server computer that is capable of independently getting from a customer the digital image data and the order data including the delivery request. In other words, the second embodiment shows a cooperation of a plurality of systems of printing and delivering service, each of computers 37, 38 and 39 being the server computer of each of the independent print service systems, respectively. In the case of the second embodiment, the transportation system for delivery is not limited to the public transportation system, but an own delivery means that the individual delivery service system possesses may be applicable.

Of course, each of the plurality of independent print service systems in the second embodiment may include local computers connected to server computers 37, 38 and 39, respectively as in FIG. 2. However, FIG. 14 only shows the relationship between server computers for the purpose of simplicity. The relationship between the server computer and the local computers in each of the independent print service systems can be understood in the similar manner to the case of the first embodiment.

In FIG. 14, first server computer 37 is connected to first silver halide printer 40 in the first print service system. First personal computer 41 of the first customer transmits the order data and the digital image data to first server computer 37 through the Internet 42. Similarly, second server computer 38 is connected to second silver halide printer 43 in the second print service system. Second personal computer 44 of the second customer transmits the order data and the digital image data to second server computer 38 through the Internet 45. In the third print service system, third server computer 39 connected to third silver halide printer 46 is also capable of receiving order from a customer as in the first and second print service systems. The data transmission among server computers 37, 38 and 39 is done through the Internet. Alternatively the data transmission may be done by means of an internal telecommunication network available for the cooperative independent print service systems.

In the second embodiment, it is possible for first server computer 37 receiving the order from the first customer to transmit the order data and the digital image data to third server computer 39. In this case, third silver halide printer 46 produces the prints, which are delivered to the first customer by the delivery means of the third print service system in place of the first print service system.

The detailed function of each of the server computers of the second embodiment in FIG. 14 is similar to that in the first embodiment in FIG. 2. Further, each of server computers 37, 38 and 39 in the second embodiment is to be considered to serve as both the server computer and the local computer in the first embodiment in terms of the function. In other words, each of server computers 37, 38 and 39 in FIG. 14, in contrast to FIG. 2, not only transmits the order data and the digital image data to another computer, but also receives the same from another computer for carrying out the printing and delivery in response to an order accepted by another server computer. In this case, as in the local computer in the first embodiment, server computer 38 for example on receipt of the delivery confirmation data transmits the same to server computer 37 that have accepted the order for example. Server computer 37 proves the correct delivery on the basis of a comparison between the internal delivery record and the data transmitted from server computer 38 to complete the delivery case.

Figure 15:
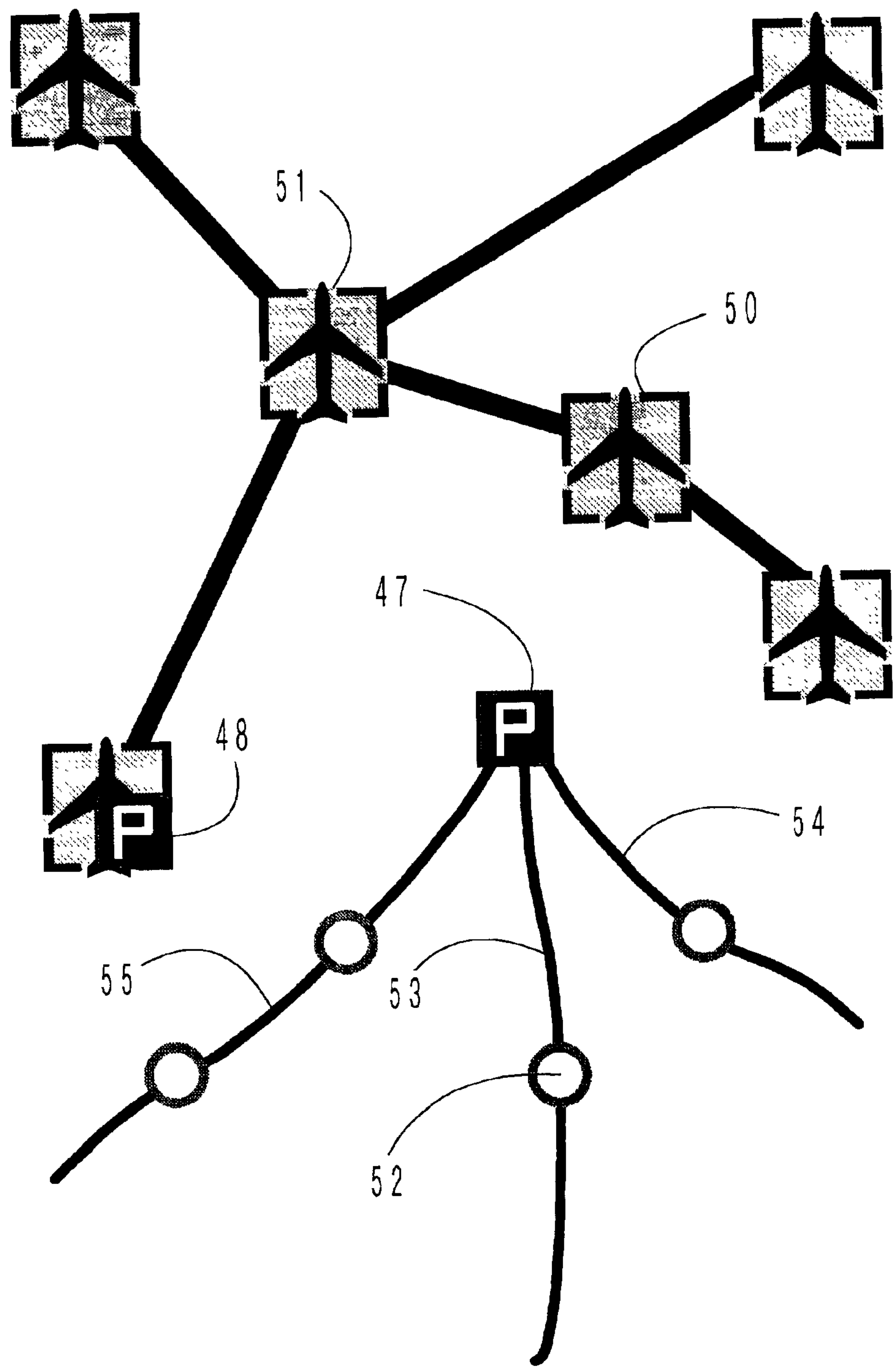
FIG. 15 represents another route map of a public transportation in accordance with the second embodiment of the present invention.

FIG. 15 represents another route map of a public transportation system including terminal of a railroad and airline, the explanation of which will be given in accordance with the second embodiment of the present invention. Terminal station 47 is provided with the first server computer and the first silver halide printer, while local airport 48 with the second server computer and the second silver halide printer.

If a customer of the first server computer gives an order for prints of digital image data with a request of delivery to a friend who lives near local airport 50, the order data and the digital image data are transmitted from the first server computer at station 47 to the second server computer at local airport 48. The second silver halide printer at local airport 48 produces the prints, which are carried by airline to local airport 50 by way of hub airport 51. The transference of the prints between planes at hub airport 51 can be easily done by means of utilizing the existing transfer system in the airport.

For another example, if a customer who is not of the first server computer, but of the second server computer gives an order with the delivery at station 52 requested, the order data and the digital image data are transmitted from second server computer at local airport 48 to the first server computer at station 47. The first silver halide printer at terminal station 47 produces the prints, which are carried by train on line 53 to station 52. Terminal station 47 is also the terminal of lines 54 and 55. However, the conveyer system in the terminal station 47 transfers the prints in the envelope to the loading control of the platform for line 53 without fail by means of detecting the platform data on the envelope printed by the delivery manager.

The following description will focus on a detailed manner of the cooperation among the plurality of independent systems of printing and delivering service as in the second embodiment.

Figure 16:
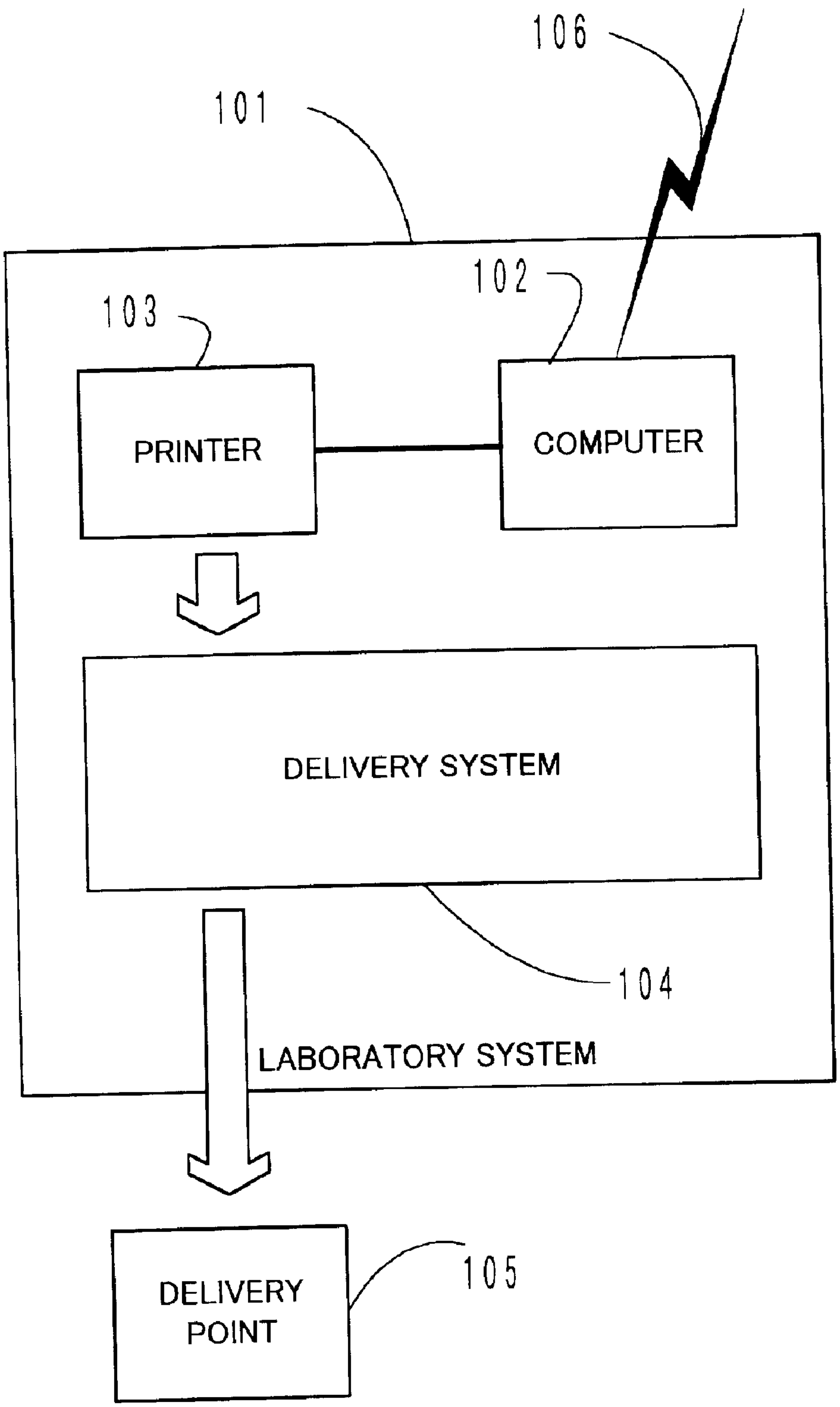
FIG. 16 represents a block diagram of the printing and delivering service system of the third embodiment according to the present invention.

FIG. 16 represents a block diagram of the printing and delivering service system (hereinafter referred to as "laboratory system") of the third embodiment according to the present invention. Laboratory system 101 is of producing silver halide prints on the basis of digital image data by means of transmitting the digital image data from computer 102. The silver halide prints produced by printer 103 are transferred to delivery system (including delivery manager, conveyer system, customer control and loading control, for example) 104 for delivering the prints to delivery point 105 at which a customer requests to receive the prints. Computer 102 is capable of transmitting or receiving the order data and the digital image data of a customer to or from another laboratory system by way of a communication means such as the Internet 106.

In considering the manner of the cooperation among the plurality of laboratory systems, delivery system 104 may be inherent in laboratory system 101 as in FIG. 101. However, the delivery system may alternatively be an independent one that cooperates with laboratory system 101 by a contract. Further, the independent delivery system may not necessarily be a specific one, but be mere one of general customers of the laboratory system 101. On the other hand, the delivery point 105 may be within laboratory system 101. In this case, a customer appears at the laboratory system 101 for directly receiving the prints as in the case of a conventional photographic laboratory, which makes delivery system 104 unnecessary. In terms of the cooperation among the plurality of laboratory systems, the present invention is not limited to the type such as in the second embodiment, but various types of laboratory systems are possible.

Referring back to FIG. 15, terminal station 47 includes the first laboratory system provided with the computer and the silver halide printer. The main delivery system of the first laboratory system is the railroad lines connecting to the terminal station 47. On the other hand, local airport 48 includes the second laboratory system provided with the computer and the silver halide printer. The main delivery system of the second laboratory system is the airline connecting the airports in FIG. 15. The first and second laboratory systems are in cooperation as to the production and the delivery of the prints on the basis of the digital image data by means of data communication through the Internet or the like.

According to the above, an example is to be considered in which a customer of the first laboratory system gives an order for prints of digital image data with a request of delivery to a friend who lives near local airport 50. In this case, the prints produced by the printer at terminal station 47 would carried to the nearest airport 48 by a vehicle or the like, and in turn to local airport 50 by airplanes by way of hub airport 51 if there were no cooperation between the laboratory systems. The use of the vehicle or the like would extremely increase the delivery cost. In the cooperation according to the present invention, however, the order data and the digital image data are transmitted from the computer at station 47 to the computer at local airport 48. The silver halide printer of the second laboratory system at local airport 48 produces the prints, which are instantly carried by airline to local airport 50 by way of hub airport 51. The transference of the prints between planes at hub airport 51 can be easily done by means of utilizing the existing transfer system in the airport.

On the other hand, if a customer gives an order to the second laboratory system with the delivery at station 52 requested, the order data and the digital image data are transmitted from the computer at local airport 48 to the computer at station 47. The silver halide printer of the first laboratory system at terminal station 47 produces the prints, which are carried by train on line 53 to station 52.

Thus, the cooperation among a plurality of laboratory systems makes it possible for the laboratory systems to commonly use the delivery means of the outside laboratory systems each other, which is advantageous for widening the service area as well as saving the time and cost of delivery on the customers.

In the case of a cooperation among a considerable number of laboratory systems, however, the management of prosecution according to the order of the customer and the adjustment of charges would be troublesome. In other words, if ten laboratory systems cooperate with each other, each laboratory system has to communicate with nine other laboratory systems for the prosecution management and the accounts balance about the transmitted orders.

Figure 17:
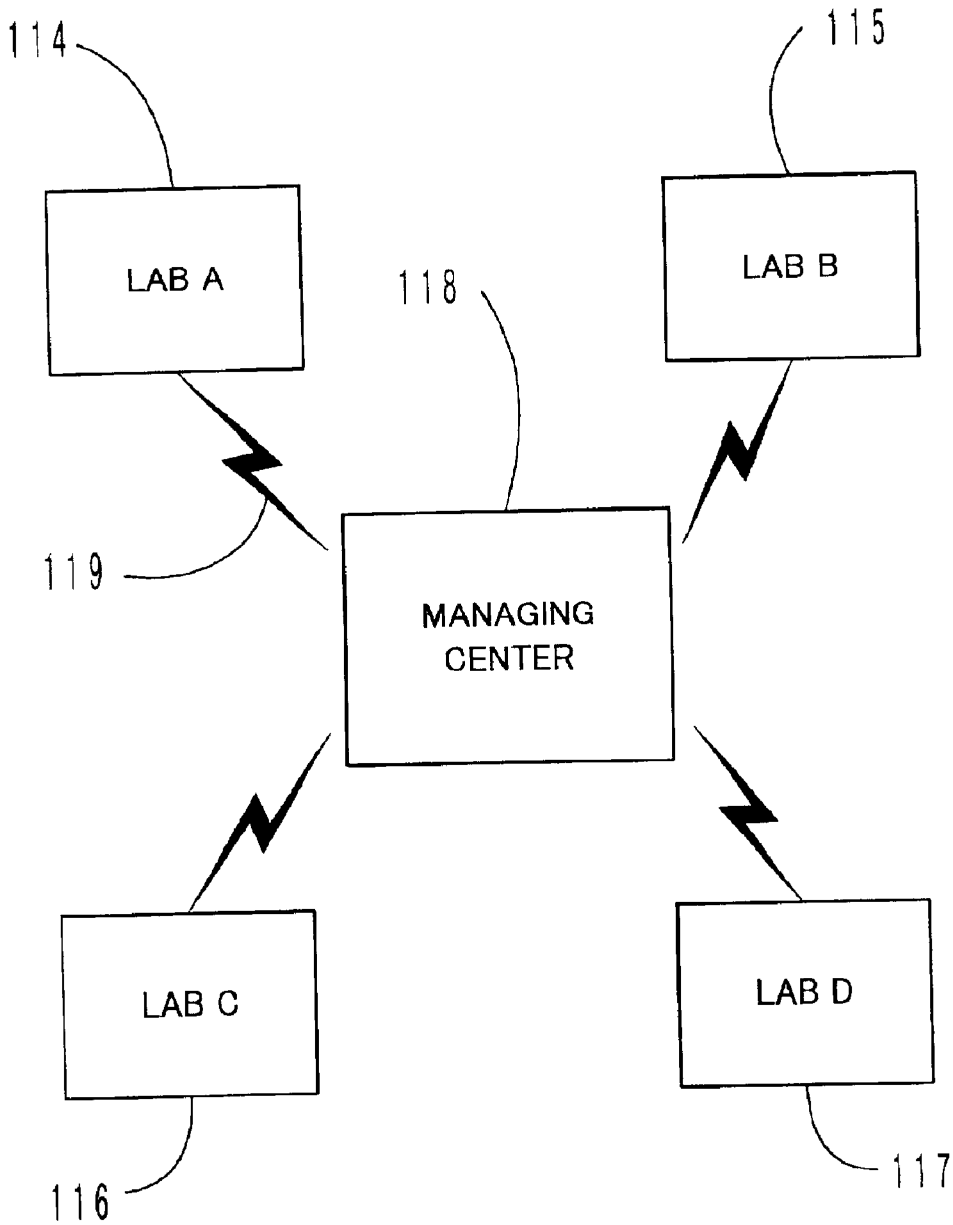
FIG. 17 represents a block diagram of a cooperating system of the third embodiment according to the present invention.

The third embodiment in FIG. 17 shows a system to solve the above mentioned disadvantage, in which the first laboratory system (hereinafter referred to as Lab A) 114 corresponds to the laboratory system in FIG. 16 including computer 102, printer 103 and delivery system 104. The other laboratory systems 115, 116 and 117 are of the similar nature. The following description will be made with the assumption that the four laboratory systems Lab A 114, Lab B 115, Lab C 116 and Lab D 117, for example cooperate with each other. In the system according to the third embodiment in FIG. 17, each laboratory system does not directly communicate with the other laboratory systems, but with common managing center 118 through the Internet 119 or the like. In other words, the transmission of the order data and the digital image data from Lab A 114 to Lab B 115 is carried out by way of managing center 118, for example. Thus, each laboratory system has to communicate with only one place, managing center regardless of the number of the cooperating laboratory systems.

A modification of the system in FIG. 17 is possible, in which one of Lab A 114 to Lab D 117 also serves as managing center 118. In other words, one of Lab A 114 to Lab D 117 is combined with managing center 118 in such a modification. For the purpose of simplification, however, the following description will be made on the case that managing center 118 is separated from any of Lab A 114 to Lab D 117 as is shown in FIG. 17.

The cooperation system according to the third embodiment in FIG. 17 is not only applicable to the service system of printing and delivering the digital image data, but also generally applicable to any other delivering system of a product. The explanation, however, will be made on the digital image printing and delivering service system, for example.

Figure 18:
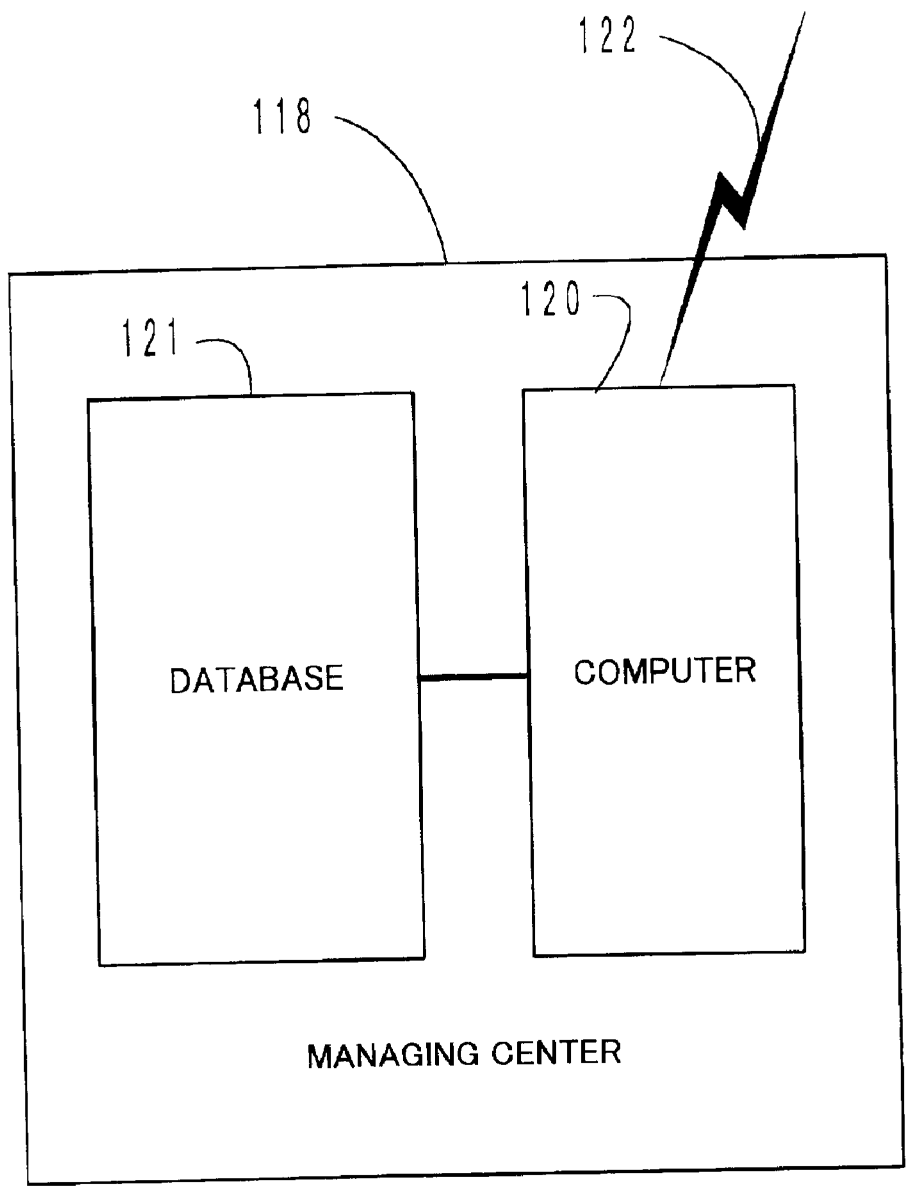
FIG. 18 represents a detailed block diagram of managing center in FIG. 17.

FIG. 18 represents a detailed block diagram of managing center 118. Managing center 118 includes computer 120 and database 121, computer 120 being in communication with any of the laboratory systems through the Internet 122.

Figure 19:
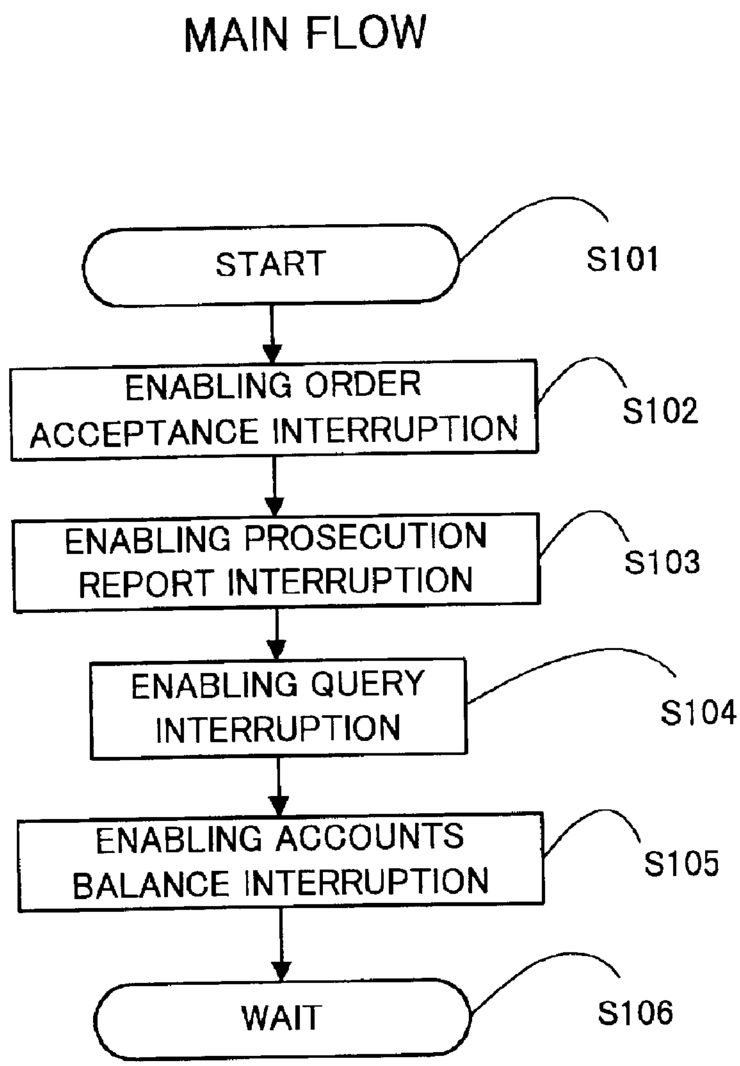
FIG. 19 represents a flow chart showing the main flow of the computer in FIG. 18.

FIG. 19 represents a flow chart showing the main flow of computer 120. Starting with step S101, the flow enables order acceptance interruption in step S102, prosecution report interruption in step S103, query interruption in step S104, and accounts balance interruption in step S105. On completion of the various interruptions above, the flow comes into a waiting status in step S106.

Figure 20:
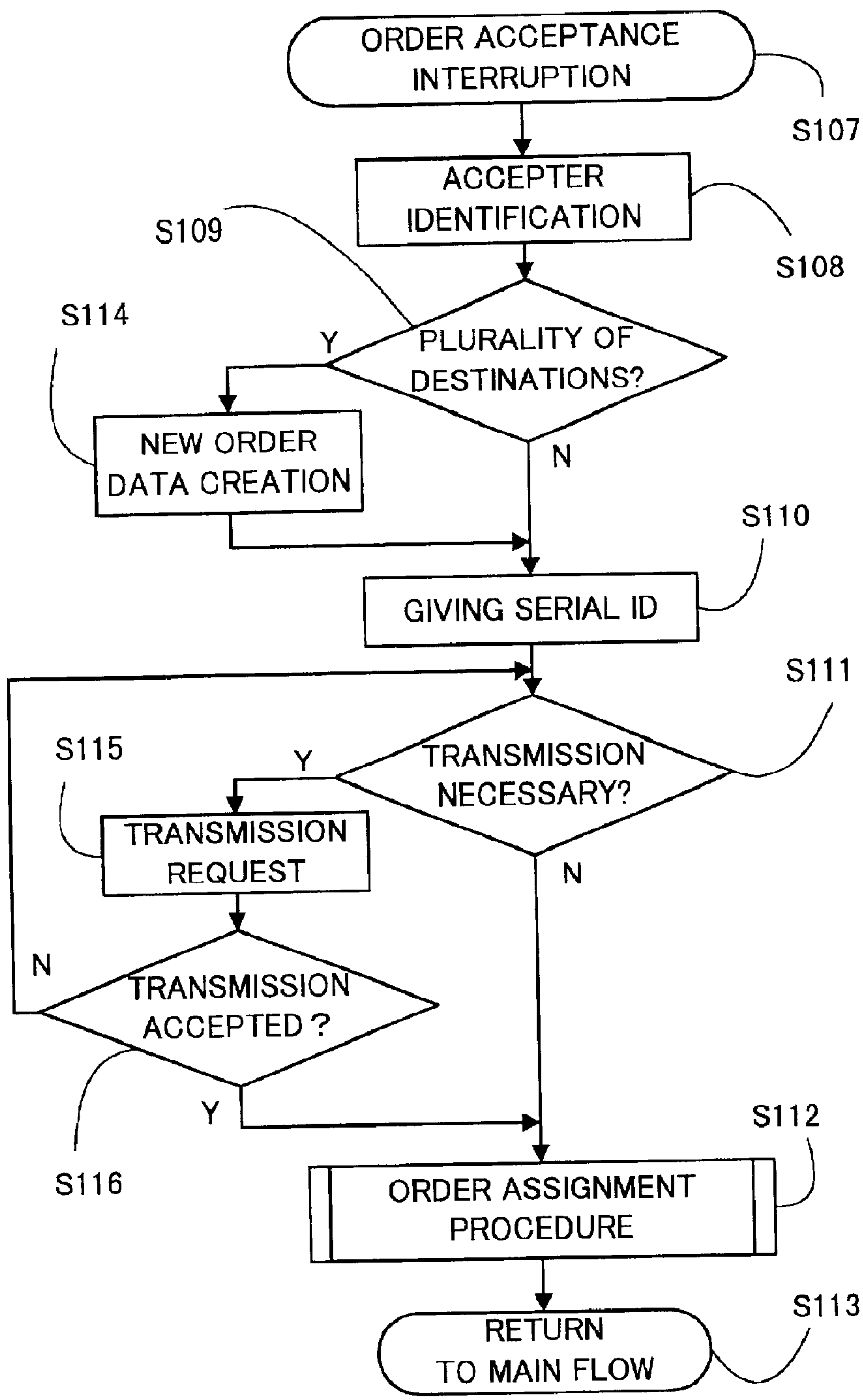
FIG. 20 represents a flow chart showing the process of order acceptance in the third embodiment.

FIG. 20 represents a flow chart showing the process of order acceptance. In step S107, the order acceptance interruption is caused by a report of order acceptance from any of the laboratory systems. Here, some comments are given on various data to be input upon order acceptance. FIG. 21 represents data input form to be displayed on the computer of the laboratory system upon reporting the order acceptance from the laboratory system to the managing center. If the report is to be made by Lab A, the data to be input at accepter window 123 is "Lab A". In acceptance ID window 124, an ID independently given by the laboratory system is input. In FIG. 21, "1" is input at acceptance ID window 124. Though just the same acceptance ID may happen to be given among a plurality of laboratory systems, each individual order can be distinguishable from each other by means of an order ID, which is the combination of the data at accepter window 123 and the data at acceptance ID window. In this case, the order ID is "A-1", which is distinguishable from another order ID, "B-1" from Lab B.

In the case of the order in FIG. 21, the data at destination number window 125 is "3", which means that the prints have to be delivered to three different destinations, Tokyo, Kanagawa, and Osaka. At each one of transmission windows 126, the data of the laboratory system to which the order data and the digital image data are to be transmitted in accordance with the area covered by the laboratory system is input if necessary. The numbers of the prints requested are input as to every destination at prints window 127, the charges for the print and delivery service being calculated as to corresponding every destination at charge window 128. The charge is calculated on a unit price of ¥50 per regular size print, and ¥100 per A4 size print. Account window 129 indicates basic fee, print/delivery fee, and transmission fee as well as the total account, "¥3,400" to be charged on the customer. The customer will pay the total account to Lab A which has accepted the order from the customer. By the way, the print/delivery fee, "3,000" in account window 129 is equal to the total calculated at charge window 128. The detailed structure of the fees will be explained later.

Referring back to the flow in FIG. 20, if the report of order acceptance as in FIG. 21 is received, the accepter of the original order is identified in step S108, the accepter being "Lab A" in this case. In step S109, it is checked whether or not a plurality of destinations are included in the original order. If only one destination were included in the original order, the flow would advance to step S110, where the serial ID is to be given to the order by the managing center. In step S111, the necessity of transmitting the order to a laboratory system other than the accepter is checked. If there were no necessity of such an order transmission, the flow would advance to step S112 for order assignment procedure. And, the flow is to return to the main flow in step S113 upon the completion of the order assignment procedure.

In the case of the order in FIG. 21, however, the original order includes a plurality of destinations, which causes the flow to advance from step S109 to S114 for creating necessary number of new order data corresponding to each of the destinations, respectively. In other words, the original order is divided into three new order data since the number of destinations is "three" in the case of the original data in FIG. 21. In step S110, the serial ID is given to each of the new order data by the managing center, respectively. In step S111, the necessity of order transmission to a laboratory system other than the accepter is checked as to each of the three new order data. In the case of the order in FIG. 21, only the first new order data for destination ① can be simply advance to step S112 since there is no necessity of data transmission. On the contrary, the second and third new order data for destination ② and destination ③ include the necessity of transmission to Lab B and Lab C, respectively. Thus, Lab B and Lab C are contacted by the managing center in step S115 with a query as to the order data transmission. Further in step S116, it is checked whether or not each of these laboratory systems is capable of actually accepting the order transmission. If the order transmission is actually accepted by Lab B and Lab C, the flow advances to step S112 for order assignment procedure. However, if any of the order transmission is not actually accepted by one of Lab B and Lab C, the flow returns to step S111 for repeating the steps S111, S115 and S116 for the second best laboratory system, the third best laboratory system and so on, that can actually accept the order transmission. If there will be no laboratory system that accepts the transmission of an order after all, the flow goes to step S112 for order assignment procedure with such a decision that the order is to be treated by the accepter by itself without the transmission to any other laboratory system.

Figure 22:
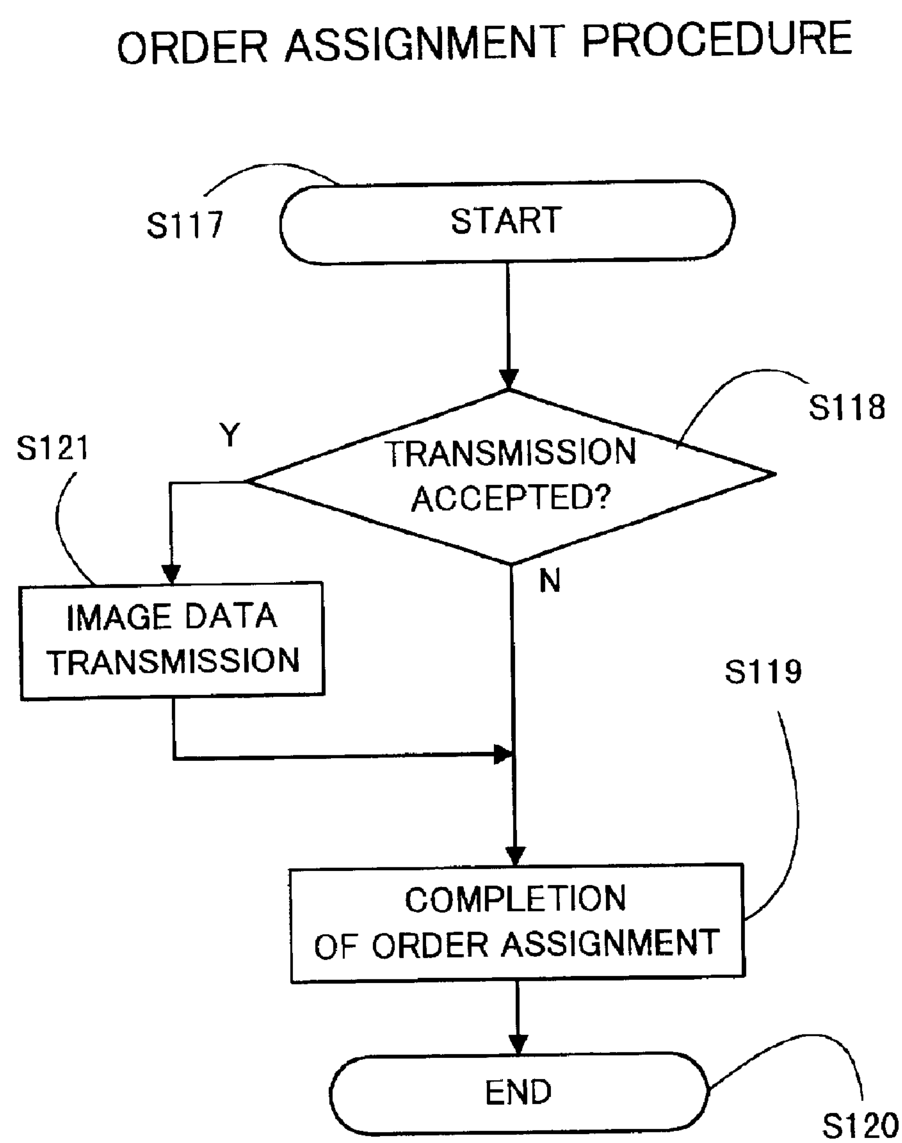
FIG. 22 represents a detailed flow of the order assignment procedure in FIG. 20.

FIG. 22 represents a detailed flow of the order assignment procedure in Step 112 in FIG. 20. Starting with step S117 in FIG. 22, it is checked in step S118 whether or not the order data is with any acceptance by a laboratory system other than the accepter as to the order transmission. If the order data is without any transmission of the acceptance, the flow advances to step S119 to determine the treatment of the order by the accepter itself. On the other hand, if the order data is with a transmission of the acceptance, the flow goes to step S121, in which the transmission of the digital image data is carried out from the accepter to the laboratory system that has accepted such a transmission. In the case of the order in FIG. 21 with the order transmission accepted by both Lab B and Lab C, the managing center requires Lab A to transmit the digital image data, and then forwards the same to Lab B and Lab C, respectively. Upon completion of the transmission the digital image data, the treatment of the orders by Lab B and Lab C are determined in step S119, respectively.

As a modification of the third embodiment above, it may be possible for Lab A to directly transmit the digital image data to Lab B and Lab C in place of the transmission by way of the managing center. In other words, only the order data that is necessary for management is transmitted by way of the managing center. In this case, the direct transmission of the digital image data between the laboratory systems should be done in correlation with the order data under the control of the managing center in step 121 so as to avoid any inconsistency between the assignment on the order data and the actual transmission of the digital image data.

FIG.23 represents a table showing a list of order data collected by the managing center for example. In the table, Serial ID represents the ID's given by the managing center in step S110 in FIG. 20. Serial ID No. 1 to No. 3 correspond to the new order data created by dividing the acceptance ID1 at Lab A into the three, which are assigned to different laboratory systems that produce and deliver the prints in accordance with the different destinations, respectively. The data in the managing center includes all the information necessary for the prosecution management and the accounts balance about the transmitted orders. For example, serial ID No. 13 accepted by Lab D with a single destination has been assigned to Lab A for the production and delivery of the prints. The total account, ¥1,600 for the production and delivery of the prints has been charged on the customer by Lab D upon the acceptance of the order. The order was assigned to Lab A on Mar. 14, 2000, and the prints have been produced and carried to the destination. However, the order has not been completed yet with the data of date and time of delivery left blank since the customer has not come to receive the prints. For another example, the prints according to the order of serial ID No. 15 has not been produced yet although the assignment of the order to Lab D has been already completed. Further, the prints according to the order of serial ID No. 16 has not been carried to the destination yet although the prints has been produced. In the case of the order of serial ID No. 18, the assignment of the order requested for Lab B has not been completed yet.

FIG. 24 represents a table showing the structure of the account charged on the customers on the basis of the orders of serial ID Nos. 1 to 4 and 7 in FIG. 23, for example. The orders of serial ID Nos. 1 to 3 are caused by the order ID, "A-1" accepted by Lab A according to the data input form in FIG. 21. According to the account structure, the laboratory system that accepts the order charges the basic fee, ¥200 on the customer. The accepter laboratory system is to further charge the transmission fee, ¥100 per one transmission on the customer. In the order of serial ID No. 1, the accepter, Lab A charges the basic fee, ¥200 as well as the transmission fee, ¥200 for the two transmissions. Further, in the order of serial ID No. 1, Lab A charges the sum of print/delivery fee, ¥500 for the service carried out by itself as to destination ①. Thus, Lab A is to get the total income, ¥900, which is the sum of the above mentioned fees.

The order of serial ID No. 2 as to destination ② from order ID, "A-1" is assigned to Lab B, which charges the sum of print/delivery fee, ¥1,000. Similarly, order of serial ID No. 3 as to destination ③ from order ID, "A-1" is assigned to Lab C, which charges the sum of print/delivery fee, ¥1,500. The customer pays the total account, ¥3,400 (I.e., ¥900 for Lab A plus ¥1,000 for Lab B plus ¥1,500 for Lab c) to Lab A in a lump sum. The print/delivery fees from serial ID Nos. 2 and 3 will be paid back from Lab A to Lab B and Lab C in accordance with the accounts balance system described later.

According to the account structure described above, only the laboratory system that accepts the order is entitled to the basic fee and the transmission fee if any. On the other hand, the laboratory system that is assigned an order originally get by another laboratory system is entitled to the print/delivery fee for the job actually done. In other words, a laboratory system that accepts an order can get at least the basic fee and the transmission fee even if it assigns the entire order to another laboratory system. Thus, the accepter laboratory system is to be rewarded for the service of accepting and transmitting an order, which may make it possible for a business to live on a service of merely accepting and transmitting orders. On the other hand, a laboratory system that is to be assigned an order by another one can secure the print/delivery fee without an effort of seeking an order by itself, and get a greater number of jobs than in a case of accepting orders only by itself.

The order of serial ID No. 4 is of a case in which the accepter, Lab B carries out all the jobs exclusively without assigning the order to any other laboratory system. Serial ID No. 7 shows an account structure of another case in which the accepter, Lab B does not carry out any print/delivery services by itself, but assigns Lab A all the jobs.

According to the embodiment above in FIG. 23, all the information of orders, including an order exclusively carried out by the accepter without any transmission to another laboratory system as in serial ID No. 4, are automatically reported to the managing center. The object of the managing center collecting the information of accepted orders is for the prosecution management and the accounts balance about the orders between the plurality of laboratory systems. In view of this object, FIG. 25 represents a table showing a simplified list of order data collected by the managing center according to a modified embodiment, in which only the orders relating to the transmission between the laboratory systems are extracted. In such a modification, there is no necessity for the accepter laboratory system to report the managing center of an order that can be handled by the accepter itself, which would omit unnecessary communication between the accepter and the managing center. This omission, on the other hand, causes an additional decision to be made by the accepter on the necessity of whether or not each accepted order has to be reported to the managing center. It basically depends on the frequency of occurrence of the necessity of transmission among all the accepted orders whether the originally mentioned manner on FIG. 23 or the modified manner on FIG. 25 is preferred by a laboratory system in reporting the order to the managing center.

However, if all the orders are automatically gathered by the managing center as in FIG. 23, the managing center can flexibly respond to various demands. FIG. 26 represents a list of all the orders that relates to Lab A, which are extracted from the database of FIG. 23. FIG. 27, on the other hand, represents a list of all the orders that Lab A is to carry out the print/delivery services, which are also extracted from the database of FIG. 23. Thus, the database of FIG. 23 can present various types of data relating to Lab A in response to the request by Lab A. Of course, the data such as in FIG. 26 or FIG. 27 can be gotten on the basis of information of orders that have been accepted by Lab A and handled by Lab A itself and information of orders that have been assigned to Lab A from other laboratory systems. In other words, Lab A can made the data in FIG. 26 or FIG. 27 on the basis of its own information and the information in FIG. 25.

Referring back to FIG. 23, the prosecution management relating to the orders transmitted between the laboratory systems is to be explained. The order of serial ID No. 2 is of a case in which Lab A assigns Lab B the print/delivery service as to destination ② in order ID, "A-1". In this case, Lab B has to report Lab A of the current status on the prosecution of the assigned print/delivery service. Such a report from Lab B is not be made directly to Lab A, but to the managing center.

FIG. 28 represents data input form to be displayed on the computer of the laboratory system upon reporting the current status of the prosecution as to the assigned print/delivery service. FIG. 28 shows the case of serial ID No. 2 in which Lab B makes the report for example. In window 138, the assignee of this case, "Lab B" is indicated. Serial ID No. 2 is identified with "2" shown in managing center ID window 131. In the windows under "Order", various order data for serial ID No. 2 gotten from the database are shown. The windows under "Report" constitutes the body of the report including three boxes 132, 133 and 134 for "Printed", "Carried" and "Delivered", respectively, one of which is to be checked for one report. In the report in FIG. 28, box 134 is checked to indicate that the delivery to the customer has been completed. Report date/time window 135 indicates the date and time of the delivery. In Report date/time windows 136 and 137, the date and time of the production and carriage of the prints remain as the history of the preceding reports, respectively.

The data for serial ID No. 2 is of the status caused by receiving the above report of the delivery completion. In other words, the status of data for serial ID No. 2 was formerly "carried" with delivery date/time blank, which is similar to that of the data for serial ID No. 6, before receiving the report. And then, the status has changed as shown in FIG. 23 as the result of the report.

Figure 29:
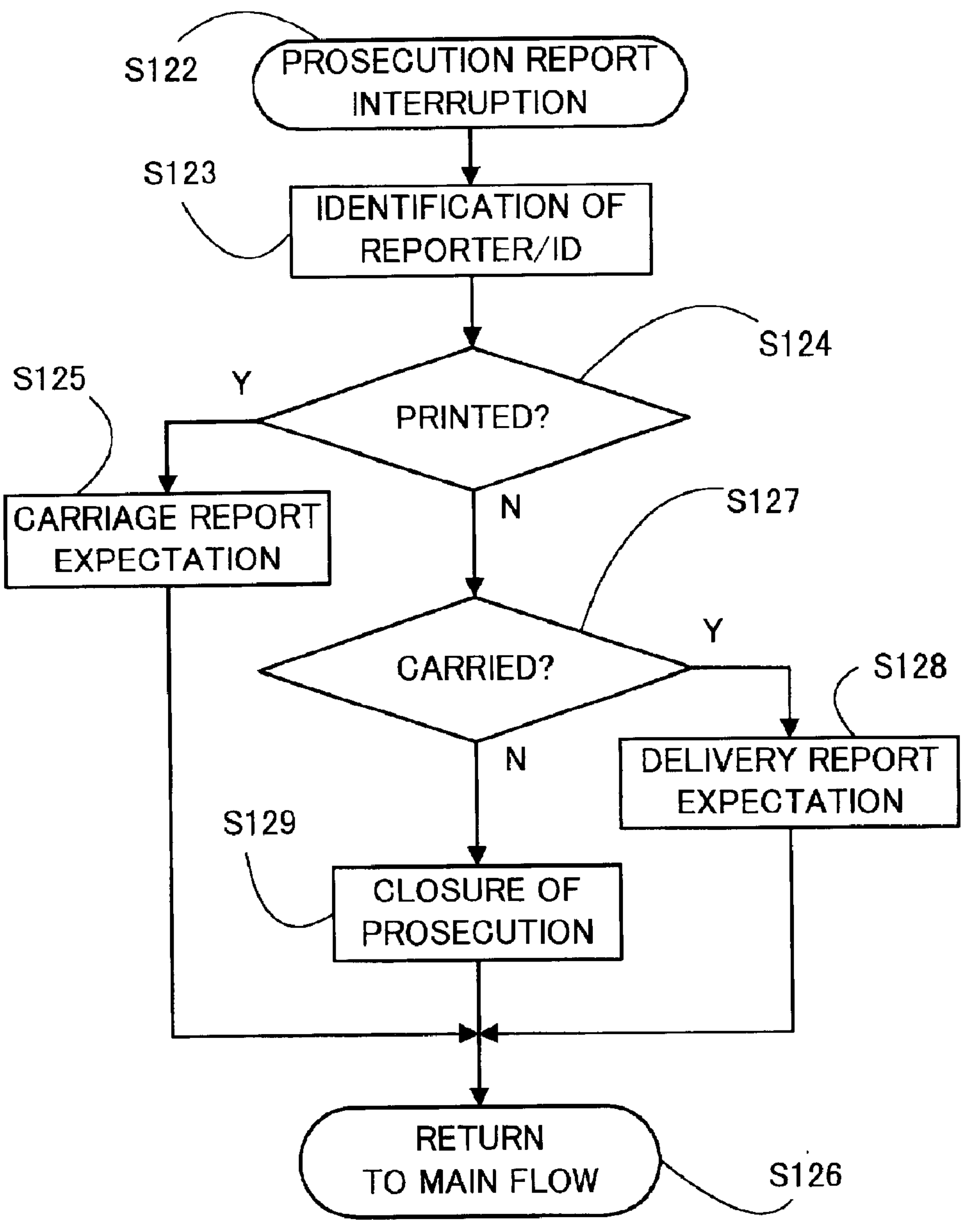
FIG. 29 represents a flow of prosecution report to be carried out when the report as in FIG. 28 is made.

FIG. 29 represents a flow of prosecution report to be carried out when the report as in FIG. 28 is made. The prosecution report interruption is caused by receiving the report in step S122. In step S123, the reporter and the serial ID of the order are identified. In step s124, it is checked whether or not box 132 is checked to identify the report of the completion of producing the prints. If the answer is "YES" the flow goes to step S125, in which the managing center inputs the data of the report. Further in step S125, the managing center arranges a carriage report expectation state, in which an error caution is prepared for the next report with a box other than box 133 checked. This is because the correct report that should be expected to follow is for the completion of the carriage of the prints. The flow then returns to the main flow in step S126. On the other hand, the answer, "NO" in step S124 means that the report is for the completion of the carriage or the delivery of the prints. So, the flow advances to step S127 for further determination. In step s127, it is checked whether or not box 133 is checked to identify the report of the completion of carrying the prints.

If the answer is "YES" the flow goes to step S128, in which the managing center inputs the data of the report. Further in step S128, the managing center arranges a delivery report expectation state, in which an error caution is prepared for the next report with a box other than box 134 checked. This is because the correct report that should be expected to follow is for the completion of the delivery of the prints. The flow then returns to the main flow in step S126. On the other hand, the answer, "NO" in step S127 means that the report is for the completion of the delivery of the prints. So, the flow advances to step S129 to input the data of the report and close the prosecution of the order to return to the main flow in step S126.

Figure 30:
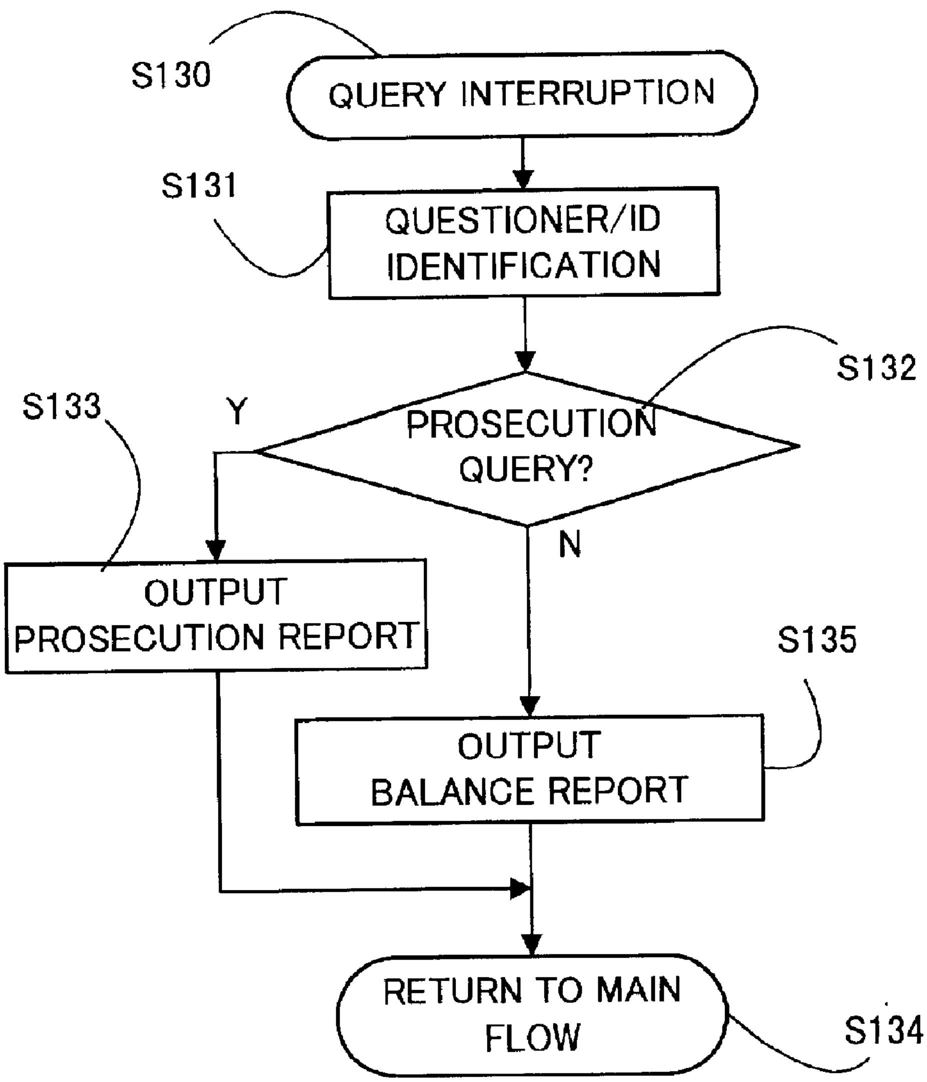
FIG. 30 represents a flow of query that is to be made from a laboratory system to the managing center.

FIG. 30 represents a flow of query that is to be made from a laboratory system to the managing center. The query from a laboratory system causes the query interruption in step S130. In step S131, the questioner and the serial ID of the order are identified. In step s132, it is checked whether or not the query relates to the prosecution management. If the answer is "YES" the flow goes to step S133, in which the prosecution management information is output and forwarded to the questioner. The flow then returns to the main flow in step S134. On the other hand, the answer, "NO" in step S132 means that the report relates to the accounts balance. So, the flow advances to step S135 to output the accounts balance information and forward the same to the questioner. The flow then returns to the main flow in step S134.

As a modification of the flow in FIG. 30, the query interruption in step S130 may be periodically caused in automatic response to every lapse of a predetermined time, in addition to responding to the query from an individual laboratory system. In the case of such a periodical query interruption, the check in step S132 may omitted to output both the prosecution management and the accounts balance information for all the relating laboratory systems, respectively, and forward them to each of the laboratory systems.

FIG. 31 represents an example of a list of the prosecution management information to be output in step S133. The information FIG. 31 is output in response to the query from Lab A, in which all the orders that Lab A has assigned to other laboratory systems are listed. Due to the information, Lab A grasp the current status for all the orders that Lab A has accepted, in spite of assigning them to other laboratory systems. Thus, Lab A can answer to a query from any customer and take responsibility for the sure delivery of the prints to the customers. Lab A owes this to the managing center to which the other laboratory systems have to make the prosecution reports.

FIG. 32 represents an example of a list of the accounts balance information to be output in step S135. FIG. 32 shows the information in response to the query from Lab A, in which all the orders that Lab A has assigned to other laboratory systems as well as all the orders that other laboratory systems have assigned to Lab A are listed. The accounts balance relating to Lab A are not done with other laboratory systems, respectively, but is done only with management center in lump sum. As to the individual relation between Lab A and Lab B for example, Lab A would have to pay the sum, ¥2,200 for serial ID No. 2 and No. 6, and be entitled to receive ¥3,000, which means that Lab B owes ¥800 to Lab A in total. Lab A further needs similar accounts balance with Lab C and Lab D, respectively. According to the present invention, however, any accounts balance is not done directly between the laboratory systems. But, Lab A has to know the total amount, ¥4,650 that has to be paid to other laboratory systems as well as the total amount, ¥4,600 that has to get form other laboratory systems to finally calculate the balance, ¥50 that Lab A has to pay to the managing center. There is no necessity for Lab A to know the individual relations with other laboratory systems at all, but the balance with the managing center is only necessary. Such a balance to be adjusted in lump sum with the managing center can be gotten anytime by making a query to the managing center. As in the above explanation, each laboratory system greatly reduce the burden of the accounts balance by means of the lump sum adjustment with the managing center in place of the individual adjustment among the laboratory systems which would be necessary but for the managing center. FIG. 32 may seem to fail of listing the order of serial ID No. 18 appearing in FIG. 31. This is, however, correct since the assignment of the order of serial ID No. 18 to Lab B has not been completed yet though it is requested for by Lab A.

Figure 33:
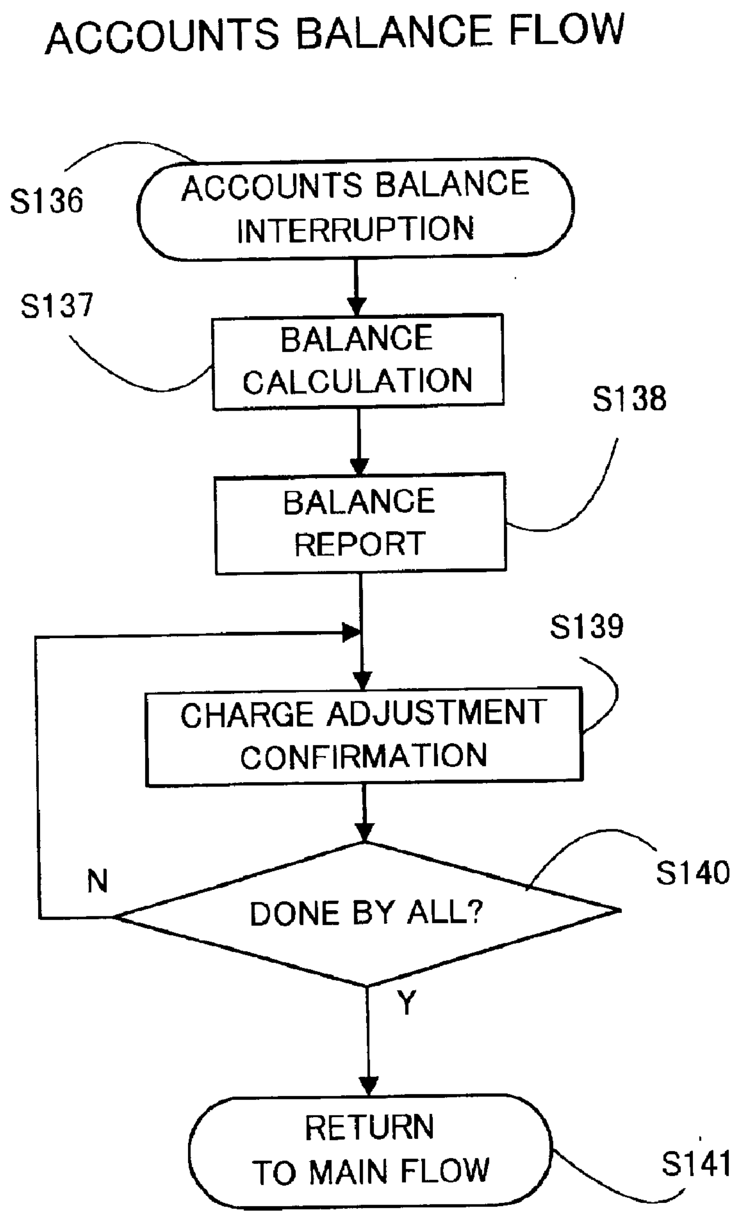
FIG. 33 represents a flow of accounts balance that is to be made between the managing center and each of the laboratory systems.

FIG. 33 represents a flow of accounts balance that is to be made between the managing center and each of the laboratory systems. The accounts balance interruption in step S136 is automatically and periodically caused on a specific date, such as the last day of every month. In other words, the accounts balance for the orders transmitted among the laboratory systems are to be kept undone for a predetermined period, and to be done in lump sum at the end of the period as to only the final balance, which omits the burden of the accounts balance that would be caused by each order transmission. The managing center calculates the balance as in FIG. 32 as to each laboratory system in step S137, and reports the result to each laboratory system in step S138, respectively. The computer of each laboratory system informed of the balance is to instantly carry out the accounts balance with the managing center as to the balance, which is confirmed instep S139. In step s140, it is checked whether or not all the laboratory systems have done the accounts balance. If the answer is "YES", the flow returns to the main flow in step S141. On the other hand, if the answer is "NO", the flow returns to step S139, and repeats the return till all the laboratory systems complete the accounts balance.

The accounts balance through the managing center according to present invention described above can be applicable not only to the cooperation among the laboratory systems for print/delivery service of the digital image, but also to a cooperation among selling/delivery service systems for general products. Further, the present invention can also applicable to an adjustment of debit/credit among a great number of business systems.

What is claimed is:

1. A cooperation system among a plurality of sites for print service comprising:

a first printer located at a first site where a first public transportation system is available for delivering the print;

a second printer located at a second site where a second public transportation system is available for delivering the print; and a computer located at an acceptance site where an order from a customer to make a print of digital image data and to deliver the print to a designated destination is accepted, wherein the computer includes a decider that decides whether to assign the order to the first site or to the second site in dependence on which is the most convenient public transportation system to deliver the print to the designated destination.

2. The cooperation system according to claim 1, wherein the first site is located at a stop in the first public transportation system, while the second site is located at a stop in the second public transportation system, and wherein the designated destination is a stop in one of the first and second public transportation systems.

3. The cooperation system according to claim 2, wherein the site to which the order is assigned delivers the print from the stop where the site is located to the stop designated as the destination by its available public transportation system.

4. The cooperation system according to claim 3, wherein each of the public transportation systems is a railroad and each of the stops is a station.

5. The cooperation system according to claim 1, wherein the site to which the order is assigned delivers the print to the designated destination by its available public transportation system.

6. The cooperation system according to claim 1, further comprising a third printer located at a third site where a third public transportation system is available for delivering the print, wherein the decider decides to assign the order to the third site if the third transportation system is the most convenient to deliver the print to the designated destination.

7. The cooperation system according to claim 1, wherein the first site includes a first computer connected to the first printer for receiving data of the order assigned by the acceptance site and controlling the first printer, while the second site includes a second computer connected to the second printer for receiving data of the order assigned by the acceptance site and controlling the second printer, and wherein the acceptance site has its own available public transportation system and includes an own printer connected to the computer, the decider deciding not to assign the order to any of the first and second sites if the own transportation system is the most convenient to deliver the print to the designated destination, but to carry out the print by the own printer.

8. The cooperation system according to claim 7, wherein one of the first and second sites is capable of accepting an order from a customer to make a print of digital image data and to deliver the print to a designated destination, and wherein one of the first and second computers includes a decider that decides whether to assign the order to the other of the first and second sites or to the acceptance site in dependence on which is the most convenient public transportation system to deliver the print to the designated destination.

9. The cooperation system according to claim 8 further comprising a managing center, wherein the assignment of the order between the sites is made by way of the managing center.

10. The cooperation system according to claim 9 wherein the managing center includes a requester that asks a site whether or not to accept an assignment of the order and a recorder that records the order assignment if settled in response to an answer from the asked site.

11. The cooperation system according to claim 9 wherein the managing center includes a receiver that receives a prosecution report from a site accepting the order assignment as to the current status in prosecuting the assigned orders and a reporter that reports the current status in response to a query from another site.

12. The cooperation system according to claim 9 wherein the managing center includes a receiver that receives from each cite accounts with another site caused by the order assignment and a calculator that balances all the accounts of each site with all the other sites, respectively, to calculate a lump sum for each site to adjust with the managing center, whereby each site need not balance the accounts with the other sites individually, but with the managing center only.

13. The cooperation system according to claim 12 wherein the calculator balances the accounts caused within a predetermined period to calculate the lump sum for the predetermined period.

14. The cooperation system according to claim 9 wherein the managing center includes a divider that divides a special order into a plurality of sub-orders, which are to be delivered to the plurality of destinations.

15. The cooperation system according to claim 7, wherein the computer of the acceptance site transmits to one of the first and second computers the data of the order including the digital image data to be printed and the data of destination to which the print is to be delivered.

16. The cooperation system according to claim 1, wherein the acceptance site is capable of accepting the order from a customer directly appearing at the acceptance site.

17. The cooperation system according to claim 1, wherein the acceptance site is capable of accepting the order by way of a computer communication between the computer of the acceptance site and a personal computer of the customer.

18. The cooperation system according to claim 17, wherein the computer of the acceptance site is arranged to provide the personal computer of the customer with a requirement of a plurality of kinds of data necessary for accepting the order.

19. The cooperation system according to claim 18, wherein the computer of the acceptance site is arranged to provide the personal computer of the customer with a combined data composed of the plurality of kinds of data transmitted from the personal computer of the customer.

20. The cooperation system according to claim 19, wherein the computer of the acceptance site is arranged to provide the personal computer of the customer with a requirement of the combined data in place of the plurality of kinds of data necessary for accepting the order.

21. The cooperation system according to claim 20, wherein the computer of the acceptance site is arranged to divide the combined data transmitted form the personal computer of the customer into the plurality of kinds of data necessary for accepting the order.

22. A cooperation system among a plurality of sites for print service comprising:

a first printer located at a first site where a first public transportation system is available for delivering the print; and a second printer located at a second site where a second public transportation system is available for delivering the print, the second site being capable of accepting an order from a customer to make a print of digital image data and to deliver the print to a designated destination and including a computer connected to the second printer, and wherein the computer includes a decider that decides whether to assign the order to the first site or to carry out the print by the second printer in dependence on which is the most convenient public transportation system to deliver the print to the designated destination.

23. The cooperation system according to claim 22 further comprising a managing center, wherein the assignment of the order from the second site to the first site is made by way of the managing center.

24. The cooperation system according to claim 22, wherein the first site being capable of accepting an order from a customer to make a print of digital image data and to deliver the print to a designated destination and including a computer connected to the first printer, and wherein the computer in the first site includes a decider that decides whether to assign the order to the second site or to carry out the print by the first printer in dependence on which is the most convenient public transportation system to deliver the print to the designated destination.

25. In a cooperation system among a plurality of sites for print service, each site having a printer and its own available public transportation system for delivering the print, a site comprising:

a printer;

an accepter capable of accepting an order from a customer to make a print of digital image data and to deliver the print to a designated destination; and a decider that decides whether to assign the order to another site or to carry out the print by its own printer in dependence on which is the most convenient public transportation system to deliver the print to the designated destination.

26. The site according to claim 25, further comprising a receiver that receives data of an order assigned to the site by another site, and wherein the site carries out the print of the assigned order by its own printer.

27. The site according to claim 25, wherein the site is located at a stop in its own public transportation system, and wherein the designated destination is a stop in the same public transportation system.

28. The site according to claim 25, further comprising a receiver that receives the payment from the customer charged on the entire order regardless of the decision by the decider, whereby a debt is caused if the decider decides to assign the order to another site.

29. In a cooperation system among a plurality of sites for print service, a site comprising:

an accepter capable of accepting an order from a customer to make a print of digital image data;

a decider that decides whether to assign the order to another site or to carry out the order by itself; and a receiver that receives the payment from the customer charged on the entire order regardless of the decision by the decider, whereby a debt is caused if the decider decides to assign the order to another site.

30. The site according to claim 29, further comprising an adjuster that adjusts the dept with a basic fee that the site accepting the order is entitled to get.

31. The site according to claim 29, further comprising an adjuster that adjusts the dept with an assignment fee that the site accepting the order is entitled to get if the order needs an assignment of the order.

32. In a cooperation system among a plurality of sites for print service, an order acceptance site in cooperation with sites each having a printer and its own available public transportation system for delivering the print, comprising:

an accepter that accepts an order from a customer to make a print of digital image data and to deliver the print to a designated destination; and a decider that makes a decision on an assignment of the order to another site in dependence on which is the most convenient public transportation system to deliver the print to the designated destination.

33. The order acceptance site according to claim 32, further comprising its own printer, wherein the acceptance site has its own available public transportation system, and wherein the decider decides not to assign the order to any of the other sites if the own transportation system is the most convenient to deliver the print to the designated destination, but to carry out the print by the own printer.

34. A site of print service having an available public transportation system comprising:

a printer; and a receiver that receives an order to make a print of digital image data and to deliver the print to a designated destination, wherein the site is located at a stop in the public transportation system and the designated destination is a stop in the same public transportation system.

35. The site according to claim 34, wherein the receiver accepts the order directly from a customer.

36. The site according to claim 34, wherein the order received by the receiver is an assignment to the site from another site that has accepted the order.

37. The site according to claim 34, wherein the print is to be delivered from the site to the designated destination by the available public transportation system.

38. The site according to claim 34, wherein the site is located at an airport on the airline system.

39. The site according to claim 34, wherein the site is located at a station on the railway system.

40. A print service located at a station on the railway system comprising:

a printer; and a receiver that receives an order to make a print of digital image data.

41. The print service according to claim 40 further comprising a loading control system that controls the loading of a correct train with the print for the purpose of a delivery of the print to another station.

42. The print service according to claim 40 further comprising a delivery management system that manages the delivery of the print.

43. The print service according to claim 42, wherein the delivery management system is arranged to add delivery data to the print.

44. The print service according to claim 43, wherein the delivery management system is arranged to prepare a container for the print, wherein the delivery data is added on the container.

45. The print service according to claim 43, wherein the delivery data includes information of the station to which the print is carried.

46. The print service according to claim 43, wherein the delivery data includes information of whether the print is to be delivered at the station or to be carried to another station.

47. The print service according to claim 43, wherein the delivery data includes information of a platform at which a train is loaded with the print.

48. The print service according to claim 43, wherein the delivery data includes information of a direction of a train for a station to which the print is to be delivered.

49. A method of accepting an order from a personal computer of a customer comprising the steps of:

identifying the customer;

deciding whether to provide the personal computer with a requirement of a plurality of kinds of data necessary for accepting the order or with a requirement of a combined data composed of the plurality of kinds of data in dependence on the identification of the customer;

providing the personal computer with the decided requirement; and receiving the data transmitted from the personal computer in response to the requirement.

50. The method according to claim 49 further comprising the step of providing the personal computer with the combined data if the plurality of kinds of data are transmitted from the personal computer.

51. The method according to claim 50, wherein the combined data is to be kept in the personal computer until the next order.

52. The method according to claim 51 further comprising the step of dividing the combined data into the plurality of kinds of data if the combined data is transmitted from the personal computer upon the next order.

53. The method according to claim 50 further comprising the step of dividing the combined data into the plurality of kinds of data if the combined data is transmitted from the personal computer.

54. A method of accepting an order from a personal computer of a customer comprising the steps of:

providing the personal computer with a requirement of a plurality of kinds of data necessary for accepting the order;

receiving the plurality of kinds of data transmitted from the personal computer; and providing the personal computer with a combined data composed of the plurality of kinds of data.

55. A method of accepting an order from a personal computer of a customer comprising the steps of:

providing the personal computer with a requirement of a combined data composed of a plurality of kinds of data necessary for accepting the order;

receiving the combined data transmitted from the personal computer; and dividing the combined data into the plurality of kinds of data.

56. A cooperation system among a plurality of sites for print service having a first site and a second site each capable of accepting an order from a customer to make a print of digital image data and to deliver the print to a designated destination, comprising:

a first printer located at the first site;

a first computer connected to the first printer, including a first decider that decides whether to assign the second site the order accepted at the first site or to carry out the print by the first printer in dependence on the convenience of delivering the print to the designated destination;

a second printer located at the second site; and a second computer connected to the second printer, including a second decider that decides whether to assign the first site the order accepted at the second site or to carry out the print by the second printer in dependence on the convenience of delivering the print to the designated destination.

57. The cooperation system according to claim 56 further comprising a managing center, wherein the assignment of the order between the sites is made by way of the managing center.

58. The cooperation system according to claim 57 further comprising a third printer located at a third site capable of accepting an order from a customer to make a print of digital image data and to deliver the print to a designated destination, and a third computer connected to the third printer, wherein the third computer includes a third decider that decides whether to assign another site the order accepted at the third site or to carry out the print by the third printer in dependence on the convenience of delivering the print to the designated destination.

59. A cooperation system among a plurality of sites for print service comprising:

a managing center;

a first printer located at a first site;

a second printer located at a second site capable of accepting an order from a customer to make a print of digital image data; and a computer connected to the second printer, including a decider that decides whether to assign the order to the first site by way of the managing center or to carry out the print by the second printer.

60. The cooperation system according to claim 59, wherein the first site is capable of accepting an order from a customer to make a print of digital image data.

61. The cooperation system according to claim 60, further comprising a computer connected to the first printer, including a decider that decides whether to assign the order to the second site by way of the managing center or to carry out the print by the first printer.

62. The cooperation system according to claim 59, further comprising a computer connected to the first printer, including a decider that decides whether or not to accept the order assignment from the second site.

63. A cooperation system among a plurality of sites for print service comprising:

a managing center;

a first printer located at a first site;

an accepter located at a second site capable of accepting an order from a customer to make a print of digital image data;

a reporter located at the second site, the reporter informing the managing center of the order accepted by the second site; and a requester located at the managing center, the requester asking the first site whether or not to accept an assignment of the order reported by the second site.

64. The cooperation system according to claim 63, further comprising a responder located at the first site, the responder responding to the request from the managing center whether or not to accept the assignment, and a recorder located at the managing center, the recorder recording the order assignment in response to the response from the first site.

65. The cooperation system according to claim 64 further comprising a first sender located at the second site for sending to the managing center the accepted digital image data and a second sender located at the managing center for sending to the first site the digital image data in response to the responder.

66. The cooperation system according to claim 64 further comprising a sender located at the second site for sending to the first site the accepted digital image data in response to a response from the responder of the first site by way of the managing center.

67. In a cooperation system among a plurality of sites for print service by way of a managing center, the managing center comprising:

a first receiver that receives a report of an order of a print of a digital image data accepted by a first site;

a requester that asks a second site whether or not to accept an assignment of the order reported by the first site;

a second receiver that receives a response from the second cite as to the request for the order assignment to settle the assignment; and a recorder that records the order assignment from the first site to the second site if settled.

68. The managing center according to claim 67 further comprising a third receiver that receives the digital image data from the first site, and a sender that sends the digital image data to the second site if the assignment is settled.

69. The managing center according to claim 67 further comprising a director that directs the first site to send the digital image data to the second site if the assignment is settled.

70. The managing center according to claim 67, wherein the first and second sites are alternative to each other and each site is capable of both assigning the other site an order and accepting an assignment of an order from the other site, and wherein the managing center is capable of managing more than two sites in the similar manner to that of the first or second site in the cooperating system.

71. The managing center according to claim 70, wherein the requester includes a selector that selects one among the plurality of sites in dependence on the convenience of delivering the print to a customer.

72. The managing center according to claim 71 further comprising an accepter that accepts an order and a decider that decides whether to assign the order to a site or to carry out the order by the managing center by itself, whereby the managing center also acts as a site for print service.

73. The managing center according to claim 67, further comprising a fourth receiver that receives a prosecution report from a site accepting the order assignment as to the current status in prosecuting the assigned order and a second recorder that records the prosecution report.

74. The managing center according to claim 73, further comprising a fifth receiver that receives a query from a site assigning another site an order, and a reporter that reports the current status in prosecuting the assigned order on the basis of the second recorder in response to the query.

75. In a cooperation system among a plurality of sites for service by way of a managing center, the managing center comprising:

a first recorder that records order assignments between sites among the plurality of sites, respectively;

a first receiver that receives a prosecution report from each site accepting the order assignment as to the current status in prosecuting the assigned orders recorded in the first recorder;

a second recorder that records each prosecution report;

a second receiver that receives a query from a site assigning another site an order; and a reporter that reports the current status in prosecuting the assigned order on the basis of the second recorder in response to the query.

76. In a cooperation system among a plurality of sites for print service by way of a managing center, the managing center comprising:

a first recorder that records order assignments between sites among the plurality of sites, respectively;

a first receiver that receives from each site accounts with another site caused by the order assignment; and a second recorder that records the accounts among the plurality of sites with respect to each order assignment.

77. In a cooperation system among a plurality of sites for service by way of a managing center, the managing center comprising:

a first recorder that records order assignments between sites among the plurality of sites, respectively;

a second recorder that records the accounts among the plurality of sites with respect to each order assignment, the accounts being caused by the order assignment accompanied with the charge on the order; and a calculator that balances all the accounts of each site with all the other sites, respectively, to calculate a lump sum for each site to adjust with the managing center, whereby each site need not balance the accounts with the other sites individually, but with the managing center only.

78. The managing center according to claim 77, wherein the calculator balances the accounts caused within a predetermined period to calculate the lump sum for the predetermined period.

79. In a cooperation system among a plurality of sites for service by way of a managing center, the managing center comprising:

a first receiver that receives reports of orders from the plurality of sites, the orders including a special order with a request for delivery to a plurality of destinations as well as an ordinary order with one destination of the delivery;

a divider that divides the special order into a plurality of sub-orders which are to be delivered to the plurality of destinations, respectively; and a recorder that records each of the sub-orders as an independently managed order as well as the ordinary order.

80. In a cooperation system among a plurality of sites for print service, a site comprising:

a first accepter capable of accepting an order from a customer to make a print of digital image data;

a decider that decides whether to assign the order to another site or to carry out the order by itself;

a second accepter capable of accepting an assignment of an order by another site;

a recorder that records the accounts with other sites with respect to each order assignment, the accounts being caused by the order assignment accompanied with the charge on the order; and a calculator that calculates a lump sum of charges to be adjusted with other sites by balancing the accounts caused within a predetermined period.

* * * * *